United States Patent
Marcouiller et al.

(10) Patent No.: US 9,722,407 B2
(45) Date of Patent: Aug. 1, 2017

(54) GUIDED CABLE STORAGE ASSEMBLY WITH SWITCHBACKS

(71) Applicant: ADC TELECOMMUNICATIONS, INC., Berwyn, PA (US)

(72) Inventors: Thomas Marcouiller, Shakopee, MN (US); Paula Rudenick, Jordan, MN (US)

(73) Assignee: CommScope Technologies LLC, Hickory, NC (US)

( * ) Notice: Subject to any disclaimer, the term of this patent is extended or adjusted under 35 U.S.C. 154(b) by 636 days.

(21) Appl. No.: 13/873,665

(22) Filed: Apr. 30, 2013

(65) Prior Publication Data

US 2013/0306780 A1 Nov. 21, 2013

Related U.S. Application Data

(60) Provisional application No. 61/640,410, filed on Apr. 30, 2012.

(51) Int. Cl.
*B65H 75/48* (2006.01)
*H02G 11/02* (2006.01)
(Continued)

(52) U.S. Cl.
CPC ........... *H02G 11/02* (2013.01); *B65H 75/368* (2013.01); *B65H 75/4402* (2013.01); *B65H 2701/34* (2013.01)

(58) Field of Classification Search
CPC .............. B65H 75/368; B65H 75/4471; B65H 75/4402
(Continued)

(56) References Cited

U.S. PATENT DOCUMENTS

| 342,354 A | 5/1886 | Harper |
| 415,423 A | 11/1889 | Smith |

(Continued)

FOREIGN PATENT DOCUMENTS

| EP | 0 531 628 A1 | 3/1993 |
| JP | 2-296201 | 12/1990 |

(Continued)

OTHER PUBLICATIONS

Decoiler Devices/Traverse Arms/Accessories, http://replay.web.archive.org/20060518044402/https://weldingsupply.securesites.com/, 4 pages (May 18, 2006).

(Continued)

*Primary Examiner* — Sang Kim
(74) *Attorney, Agent, or Firm* — Merchant & Gould P.C.

(57) ABSTRACT

A cable handling assembly is adapted to store and pay-out a telecommunications cable. The assembly includes first and second sets of pulleys, a housing, and a cable route. The first and second sets of pulleys are spaced from each other by a take-up distance that decreases upon the cable being paid-out. The housing supports the pulleys and also guides the pulleys as the take-up distance changes. The cable route is routed between the first and second sets of pulleys. A stack of pulley sets may be formed and may include at least one intermediate pulley set positioned between the first and second pulley sets. The cable route is routed between adjacent pulley sets of the stack of pulley sets. A route length decreases as the take-up distance decreases. A rack unit for organizing a plurality of telecommunications cables in a telecommunications rack may include a plurality of the cable handling assemblies. At least one of the cable handling assemblies may include a retraction apparatus that further adapts the at least one cable handling assembly to retract the corresponding telecommunications cable.

2 Claims, 29 Drawing Sheets

(51) Int. Cl.
*B65H 75/44* (2006.01)
*B65H 75/36* (2006.01)

(58) Field of Classification Search
USPC ............... 242/388.9, 388.91, 388.5–388.6
See application file for complete search history.

(56) References Cited

U.S. PATENT DOCUMENTS

| | | | |
|---|---|---|---|
| 1,137,133 A | | 4/1915 | Hamelback |
| 1,276,825 A | | 8/1918 | Swope |
| 1,588,577 A | | 6/1926 | Heifler |
| 1,592,030 A | | 7/1926 | Langsner |
| 1,858,371 A | | 5/1932 | Lutz |
| 2,206,352 A | | 7/1940 | Hellmann |
| 2,260,109 A | | 10/1941 | Amdal |
| 2,440,974 A | | 5/1948 | Resch |
| 2,605,060 A | | 7/1952 | Bell |
| 2,752,106 A | | 6/1956 | Thompson |
| 2,776,093 A | * | 1/1957 | Cox et al. ............... 242/388.91 |
| 2,874,918 A | | 2/1959 | Steiber |
| 2,905,409 A | | 9/1959 | Sheldon |
| 3,015,384 A | | 1/1962 | Kellogg |
| 3,120,355 A | | 2/1964 | Bowman |
| 3,160,360 A | * | 12/1964 | Lukas et al. ............. 242/388.91 |
| 3,208,121 A | | 9/1965 | Price |
| 3,632,061 A | | 1/1972 | Roseboom |
| 3,822,834 A | | 7/1974 | Fjarlie |
| 3,831,879 A | | 8/1974 | Miller et al. |
| 3,843,071 A | | 10/1974 | Graham |
| 4,008,791 A | | 2/1977 | Shafii-Kahany et al. |
| 4,055,314 A | | 10/1977 | Kovaleski |
| 4,108,390 A | | 8/1978 | Hayes |
| 4,111,380 A | | 9/1978 | Heuckroth |
| 4,174,816 A | * | 11/1979 | Olson ........................... 242/272 |
| 4,186,897 A | | 2/1980 | Brown |
| 4,222,535 A | | 9/1980 | Hosbein |
| 4,273,392 A | | 6/1981 | Stinson |
| 4,282,954 A | | 8/1981 | Hill |
| 4,301,611 A | | 11/1981 | Lapinski |
| 4,436,224 A | | 3/1984 | McInerny |
| 4,565,333 A | | 1/1986 | Meneian |
| 4,664,260 A | | 5/1987 | Stokes |
| 4,936,452 A | | 6/1990 | Pauley |
| 4,978,191 A | | 12/1990 | Hasegawa et al. |
| 5,022,600 A | | 6/1991 | Blanc et al. |
| 5,058,259 A | | 10/1991 | Araki et al. |
| 5,069,523 A | | 12/1991 | Finzel et al. |
| 5,078,466 A | | 1/1992 | MacCulloch |
| 5,098,028 A | | 3/1992 | Ida et al. |
| 5,117,859 A | * | 6/1992 | Carlson .................... 137/355.25 |
| 5,165,543 A | | 11/1992 | Heyda et al. |
| 5,265,822 A | | 11/1993 | Shober, Jr. et al. |
| 5,268,986 A | | 12/1993 | Kakii et al. |
| 5,277,314 A | | 1/1994 | Cooper et al. |
| 5,294,068 A | | 3/1994 | Baro et al. |
| 5,305,937 A | | 4/1994 | Barnett |
| 5,332,171 A | | 7/1994 | Steff |
| 5,335,874 A | | 8/1994 | Shrum et al. |
| 5,367,827 A | | 11/1994 | Tajima et al. |
| 5,388,781 A | | 2/1995 | Sauber |
| 5,417,034 A | * | 5/1995 | Gabler ................. B65D 5/0035 53/176 |
| 5,421,530 A | * | 6/1995 | Bertagna et al. ........ 242/388.91 |
| 5,450,509 A | | 9/1995 | Davis |
| 5,481,607 A | | 1/1996 | Hsiao |
| 5,494,446 A | | 2/1996 | DeLucia et al. |
| 5,544,836 A | | 8/1996 | Pera |
| 5,598,987 A | | 2/1997 | Wachowicz |
| 5,607,316 A | | 3/1997 | Ishikawa |
| 5,630,456 A | | 5/1997 | Hugo et al. |
| 5,641,067 A | | 6/1997 | Ellis |
| 5,669,571 A | | 9/1997 | Graybill |
| 5,679,015 A | | 10/1997 | Schauer |
| 5,758,834 A | | 6/1998 | Dragoo et al. |
| 5,772,146 A | | 6/1998 | Kawamoto et al. |
| 5,797,558 A | | 8/1998 | Peterson et al. |
| 5,802,237 A | | 9/1998 | Pulido |
| 5,857,285 A | | 1/1999 | Little |
| 5,913,487 A | | 6/1999 | Leatherman |
| 5,915,062 A | | 6/1999 | Jackson et al. |
| 5,915,641 A | | 6/1999 | Barberg |
| 5,921,497 A | | 7/1999 | Utley, Jr. |
| D412,439 S | | 8/1999 | Cormack |
| 5,993,229 A | | 11/1999 | Tanaka et al. |
| 5,996,930 A | | 12/1999 | Katayama et al. |
| 6,015,110 A | | 1/2000 | Lai |
| 6,019,308 A | | 2/2000 | Huang |
| D422,170 S | | 4/2000 | Harris, Jr. |
| 6,077,108 A | | 6/2000 | Lorscheider et al. |
| 6,215,938 B1 | | 4/2001 | Reitmeier et al. |
| 6,220,413 B1 | | 4/2001 | Walters et al. |
| 6,250,578 B1 | | 6/2001 | Manda |
| 6,260,781 B1 | | 7/2001 | Cooper |
| 6,305,958 B1 | | 10/2001 | Maegawa et al. |
| 6,325,665 B1 | | 12/2001 | Chung |
| 6,328,243 B1 | | 12/2001 | Yamamoto |
| 6,349,893 B1 | | 2/2002 | Daoud |
| 6,361,237 B1 | | 3/2002 | Salmela |
| 6,375,109 B1 | | 4/2002 | Liao |
| 6,405,961 B1 | | 6/2002 | Mastrangelo |
| 6,422,503 B1 | | 7/2002 | Hoo Kong |
| 6,433,274 B1 | | 8/2002 | Doss et al. |
| 6,434,313 B1 | | 8/2002 | Clapp, Jr. et al. |
| 6,484,958 B1 | | 11/2002 | Xue et al. |
| 6,501,898 B1 | | 12/2002 | Engberg et al. |
| 6,522,826 B2 | | 2/2003 | Gregory |
| 6,572,393 B2 | | 6/2003 | Kawamura |
| RE38,211 E | | 8/2003 | Peterson et al. |
| 6,612,515 B1 | | 9/2003 | Tinucci et al. |
| 6,616,080 B1 | | 9/2003 | Edwards et al. |
| 6,643,443 B2 | | 11/2003 | Holman et al. |
| 6,643,444 B1 | | 11/2003 | Putnam |
| 6,643,445 B2 | | 11/2003 | Bumgarner et al. |
| 6,733,328 B2 | | 5/2004 | Lin et al. |
| 6,744,954 B1 | | 6/2004 | Tanaka et al. |
| 6,795,633 B2 | | 9/2004 | Joseph, II |
| 6,819,848 B2 | | 11/2004 | Takahashi |
| D501,722 S | | 2/2005 | Zimmerman |
| 6,856,748 B1 | | 2/2005 | Elkins, II et al. |
| 6,871,812 B1 | | 3/2005 | Chang |
| 6,915,058 B2 | | 7/2005 | Pons |
| 6,997,410 B1 | | 2/2006 | Huang |
| 7,017,846 B2 | | 3/2006 | Tsoi et al. |
| 7,032,854 B2 | | 4/2006 | Marsden |
| 7,036,761 B2 | | 5/2006 | Washington et al. |
| 7,086,512 B2 | | 8/2006 | Shack et al. |
| 7,104,491 B2 | | 9/2006 | Vinding |
| 7,116,883 B2 | | 10/2006 | Kline et al. |
| 7,120,349 B2 | | 10/2006 | Elliott |
| 7,182,286 B2 | | 2/2007 | Huang |
| 7,229,042 B2 | | 6/2007 | Thebault et al. |
| D551,477 S | | 9/2007 | Kikuchi |
| 7,266,283 B2 | | 9/2007 | Kline et al. |
| 7,315,681 B2 | | 1/2008 | Kewitsch |
| 7,357,666 B2 | | 4/2008 | Wu |
| 7,369,739 B2 | | 5/2008 | Kline et al. |
| 7,460,753 B2 | | 12/2008 | Kewitsch |
| 7,497,351 B2 | | 3/2009 | Amundson et al. |
| 7,548,679 B2 | | 6/2009 | Hirano et al. |
| 7,599,598 B2 | | 10/2009 | Gniadek et al. |
| 7,627,218 B2 | | 12/2009 | Hurley |
| 7,665,901 B2 | | 2/2010 | Kewitsch |
| 7,680,386 B2 | | 3/2010 | Hurley |
| 7,715,679 B2 | | 5/2010 | Kowalczyk et al. |
| 7,756,379 B2 | | 7/2010 | Kowalczyk et al. |
| 7,869,682 B2 | | 1/2011 | Kowalczyk et al. |
| 8,238,707 B2 | | 8/2012 | Smrha et al. |
| 8,474,742 B2 | | 7/2013 | Smrha |
| 8,720,810 B2 | | 5/2014 | Whitaker |
| 8,800,910 B2 | | 8/2014 | Shepherd |
| 2002/0122643 A1 | | 9/2002 | Bueschelberger et al. |
| 2003/0059192 A1 | | 3/2003 | Johnson |
| 2003/0089818 A1 | | 5/2003 | Reau et al. |
| 2003/0095773 A1 | | 5/2003 | Ichinari et al. |

(56) References Cited

U.S. PATENT DOCUMENTS

| | | |
|---|---|---|
| 2004/0211851 A1 | 10/2004 | Barton et al. |
| 2005/0167544 A1 | 8/2005 | Elliott et al. |
| 2005/0247813 A1 | 11/2005 | Kovacevich et al. |
| 2005/0263640 A1 | 12/2005 | Vanderslice |
| 2006/0045458 A1 | 3/2006 | Sasaki et al. |
| 2006/0151654 A1 | 7/2006 | Pitcher |
| 2006/0196989 A1 | 9/2006 | Bartley et al. |
| 2006/0264921 A1 | 11/2006 | Deutsch et al. |
| 2007/0189829 A1 | 8/2007 | Matsushita et al. |
| 2007/0196053 A1 | 8/2007 | Kewitsch |
| 2007/0278227 A1 | 12/2007 | Damaghi et al. |
| 2008/0019642 A1 | 1/2008 | Kewitsch |
| 2008/0156922 A1* | 7/2008 | Rabinowitz et al. ......... 242/372 |
| 2008/0273844 A1 | 11/2008 | Kewitsch |
| 2008/0292261 A1 | 11/2008 | Kowalczyk et al. |
| 2009/0060441 A1 | 3/2009 | Kowalczyk et al. |
| 2009/0065629 A1 | 3/2009 | Veit |
| 2009/0074370 A1 | 3/2009 | Kowalczyk et al. |
| 2009/0097797 A1 | 4/2009 | Kewitsch |
| 2009/0140093 A1 | 6/2009 | Wu |
| 2009/0324189 A1 | 12/2009 | Hill et al. |
| 2010/0054680 A1 | 3/2010 | Lochkovic et al. |
| 2010/0329621 A1 | 12/2010 | Makrides-Saravanos et al. |
| 2011/0006146 A1* | 1/2011 | Soper et al. ................. 242/373 |
| 2011/0024543 A1 | 2/2011 | Smrha |
| 2011/0024544 A1 | 2/2011 | Smrha et al. |
| 2011/0073700 A1 | 3/2011 | Godett et al. |
| 2011/0085775 A1 | 4/2011 | Van Zuylen |
| 2011/0154867 A1 | 6/2011 | Fawcett et al. |
| 2011/0297781 A1 | 12/2011 | Peters |
| 2012/0168554 A1 | 7/2012 | Blunt et al. |
| 2012/0205477 A1 | 8/2012 | Whitaker |
| 2013/0161430 A1 | 6/2013 | Weissbrod |
| 2013/0233962 A1 | 9/2013 | Wells |
| 2013/0284843 A1 | 10/2013 | Mertesdorf |
| 2013/0284844 A1 | 10/2013 | Holmberg et al. |
| 2013/0287359 A1 | 10/2013 | Haataja |
| 2014/0027560 A1 | 1/2014 | Flood |
| 2014/0131505 A1 | 5/2014 | Gonzalez et al. |
| 2014/0161411 A1 | 6/2014 | Slater et al. |

FOREIGN PATENT DOCUMENTS

| | | |
|---|---|---|
| JP | 5-303018 | 11/1993 |
| JP | 2000-284129 | 10/2000 |
| JP | 2001-91753 | 4/2001 |
| JP | 2001-169452 | 6/2001 |
| JP | 2001-339837 | 12/2001 |
| JP | 2003-29059 | 1/2003 |
| JP | 2003-329850 | 11/2003 |
| JP | 2003-329851 | 11/2003 |
| JP | 2008-197530 | 8/2008 |
| WO | WO 99/41183 | 8/1999 |
| WO | WO 2006/015343 A2 | 2/2006 |
| WO | WO 2006/078007 A1 | 7/2006 |

OTHER PUBLICATIONS

Decoiler Devices/Traverse Arms/Accessories, https://weldingsupply.securesites.com/yeoweld-fax.html, 5 pages (Date Printed May 2, 2011).
Fiberlaunch, 4 pages (Copyright 2010).
Still images from video located at http://www.igus.com/ApplicationCorner/igus%20Videos/E-Chain/Excellent%20quality/EChainSystems_for_machinetools.wmv, 6 pages (Downloaded Dec. 2009).
Still images from video located at http://www.igus.com Dec. 8, 2009—igus_12HMInews, 3 pages (Downloaded Dec. 2009).
Telescent Catalog Fiber Optic Connectivity, pp. 1-39 (Copyright 2007).

* cited by examiner

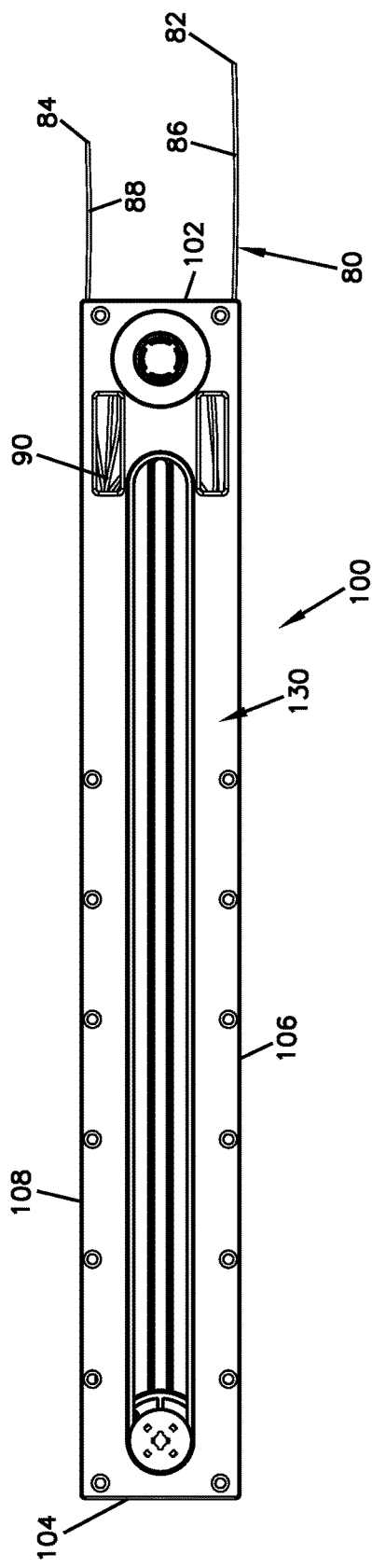
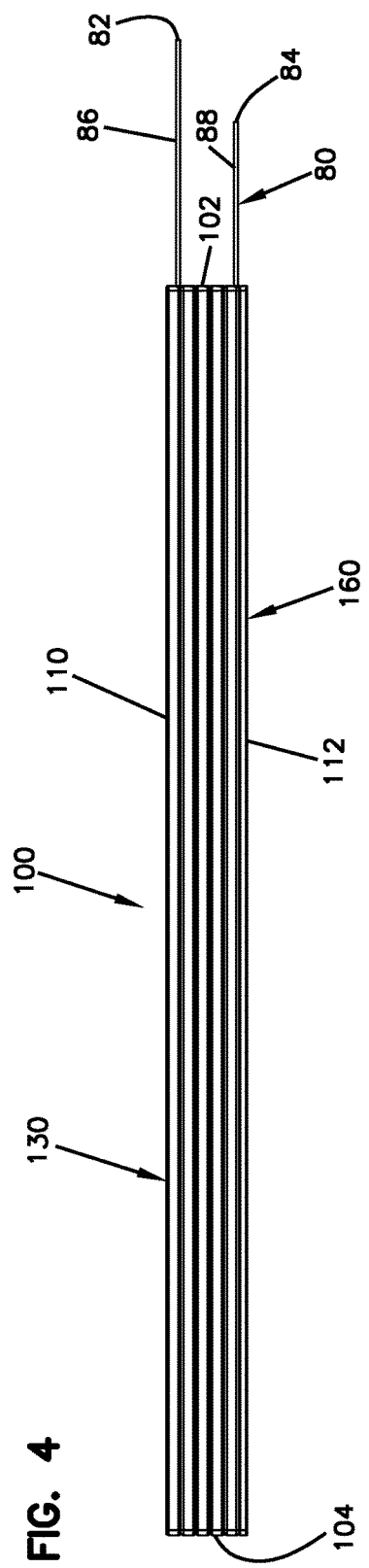

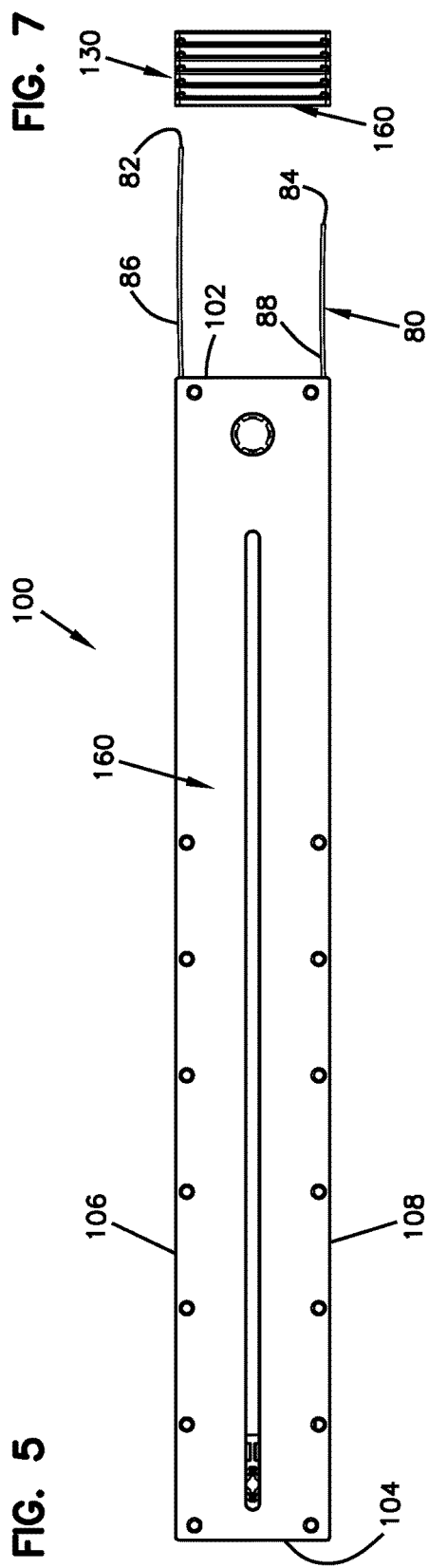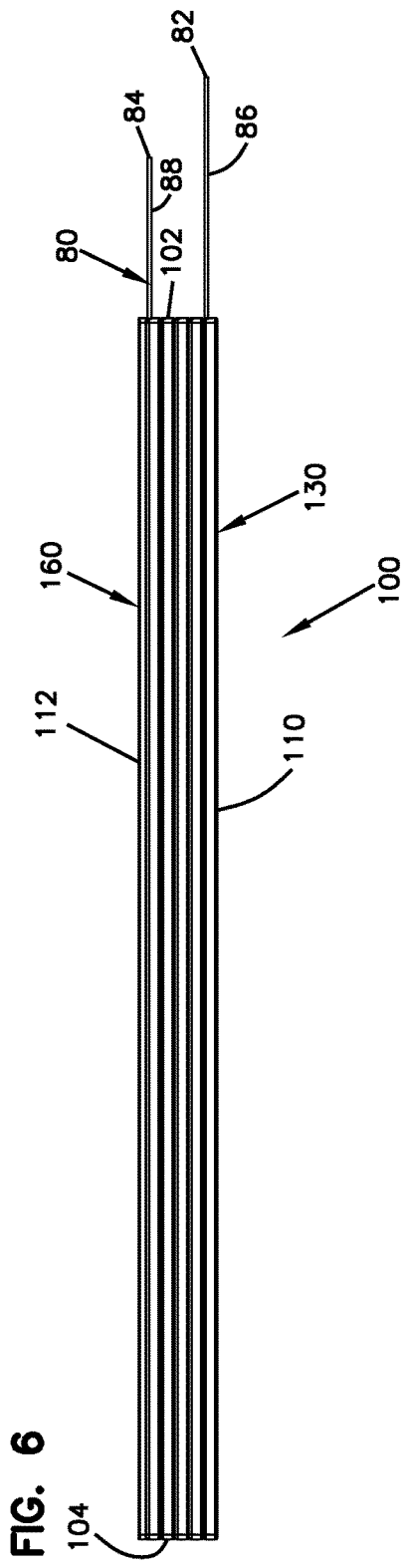

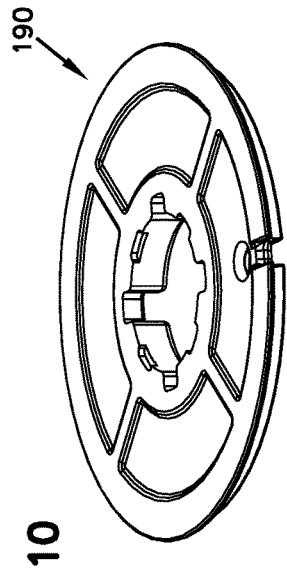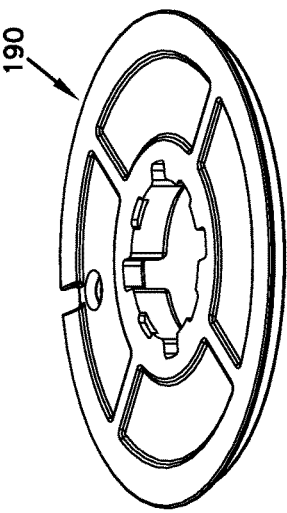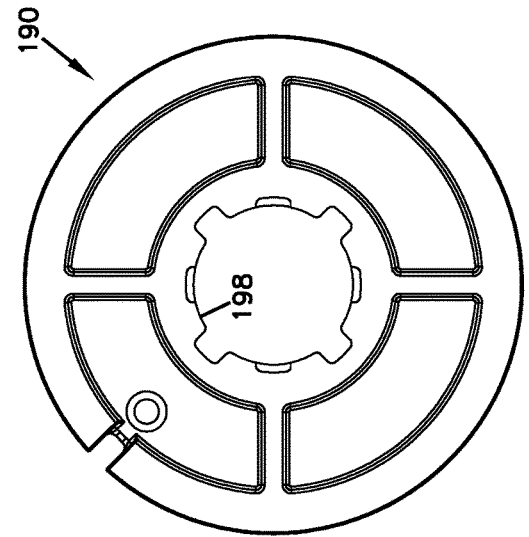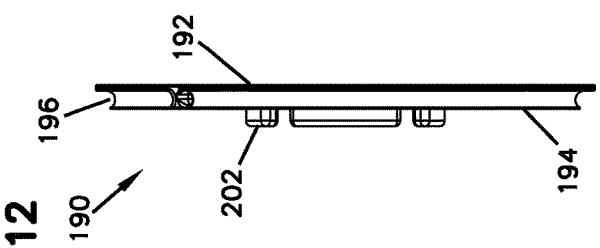

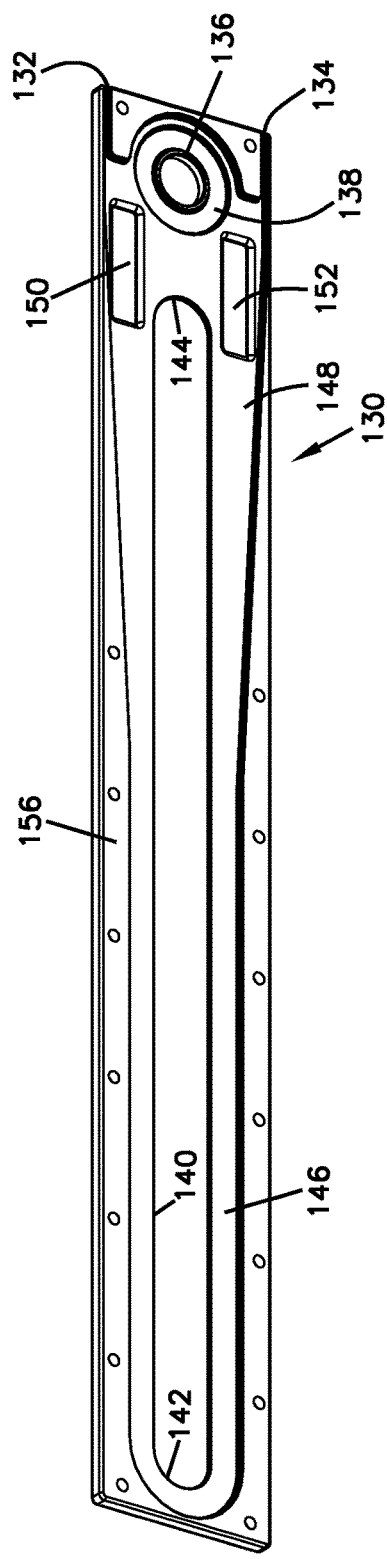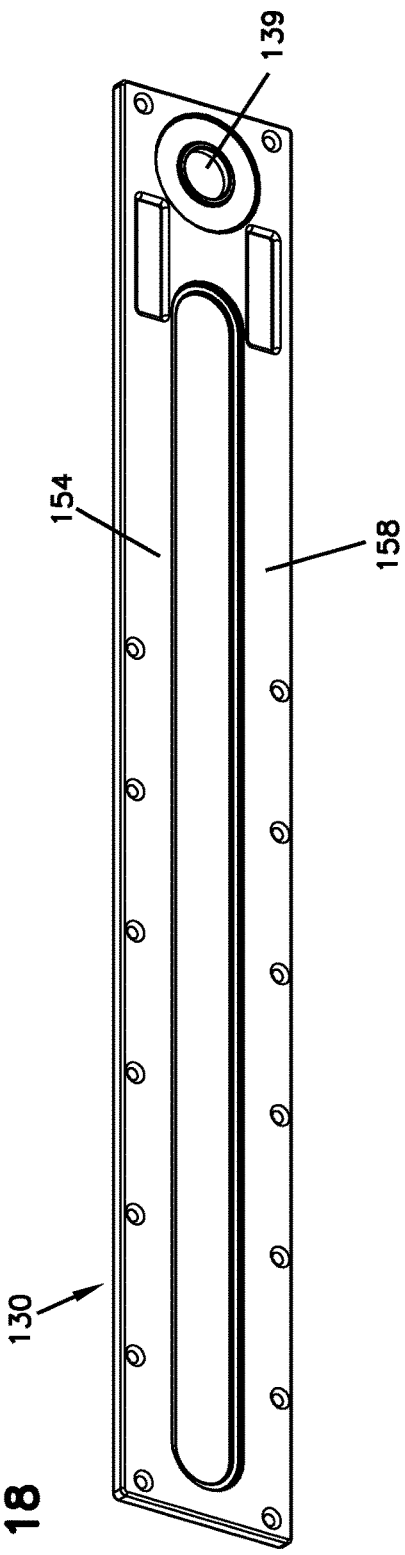

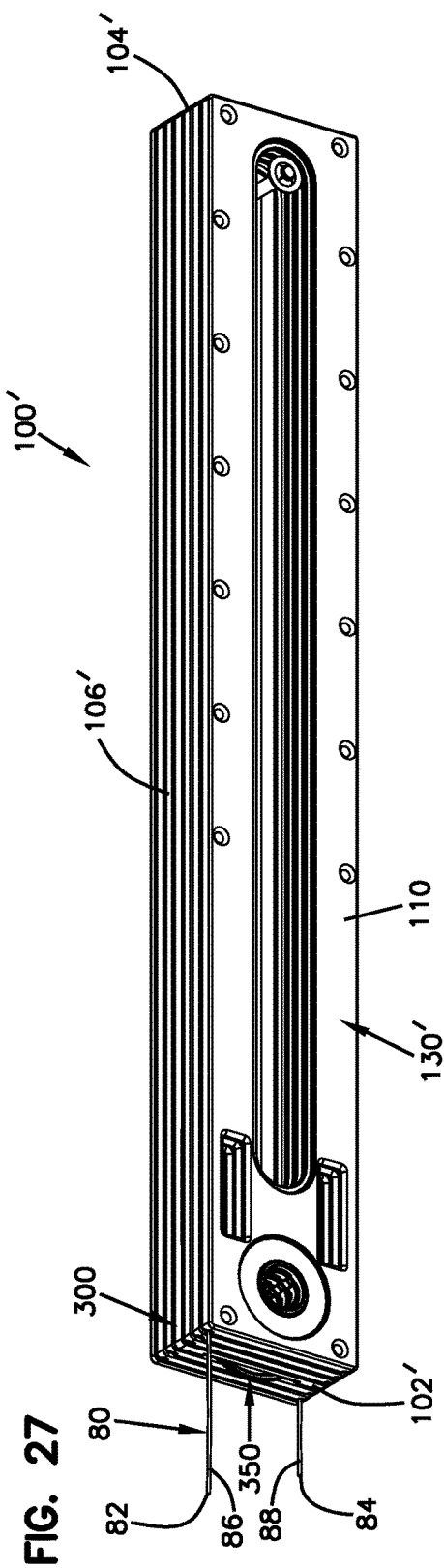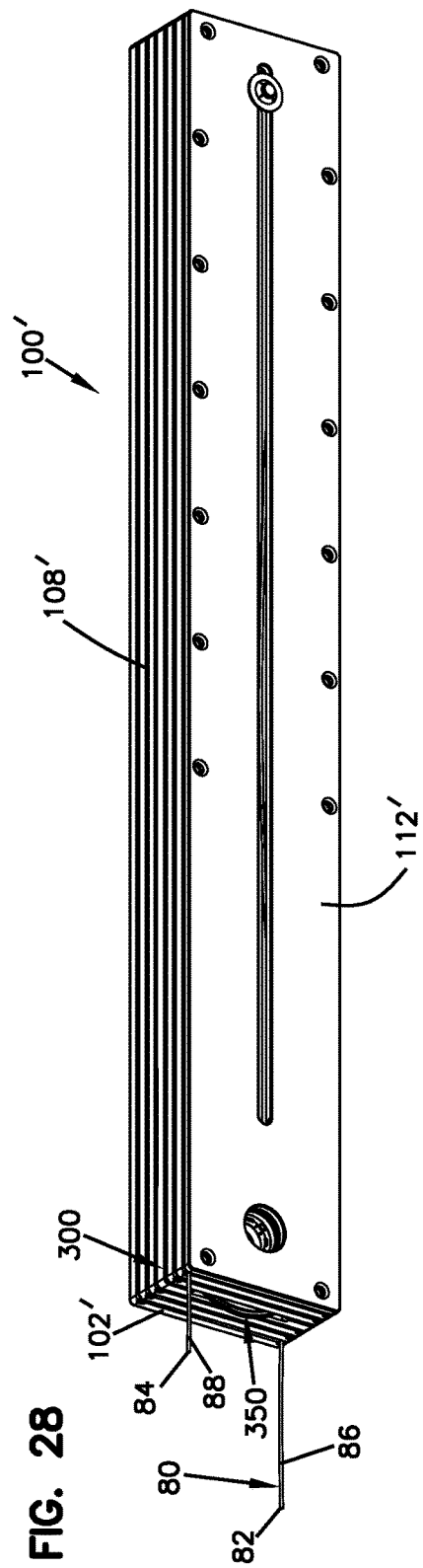

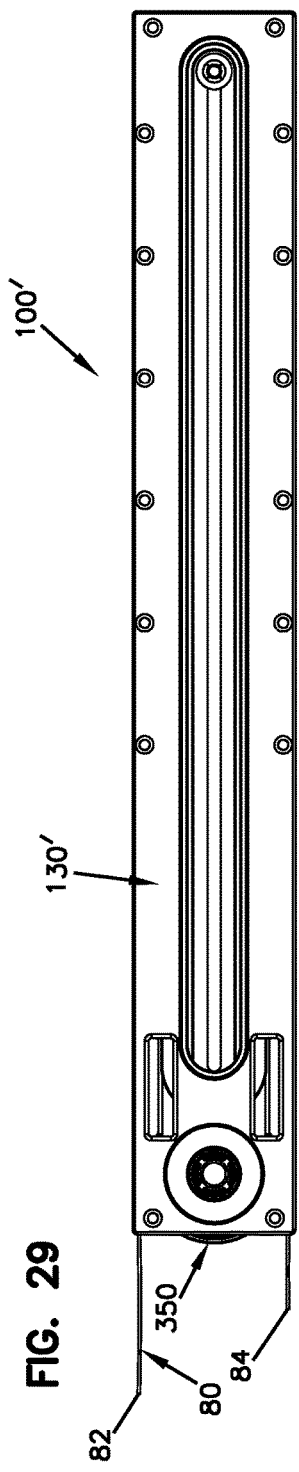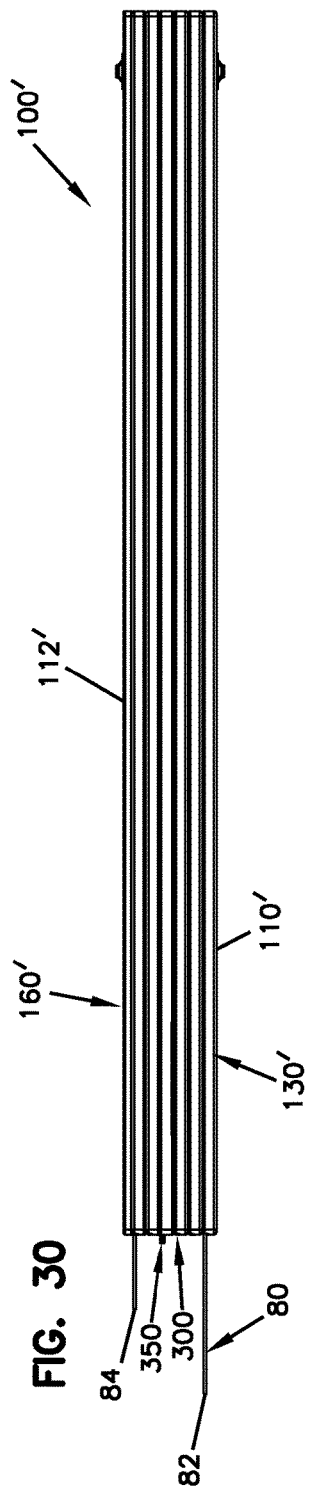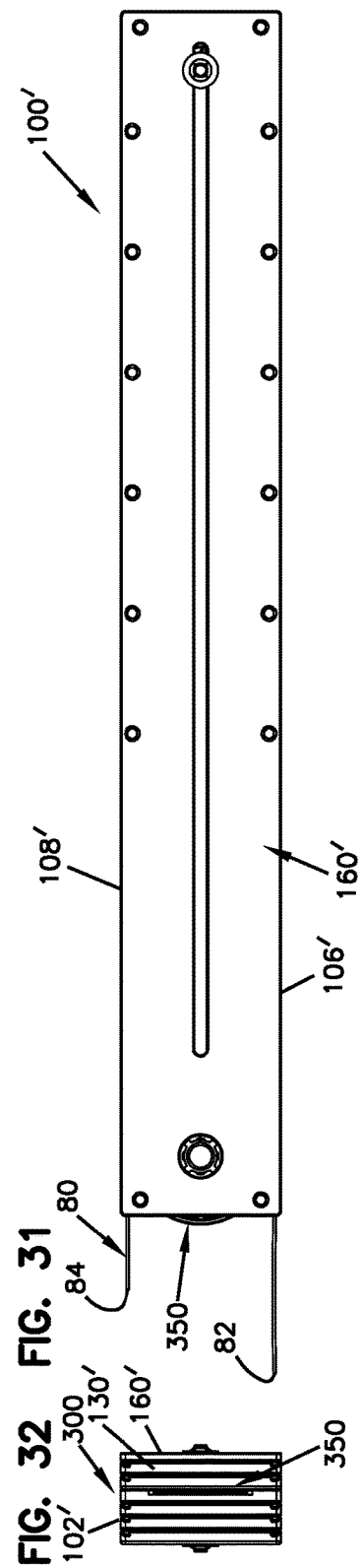

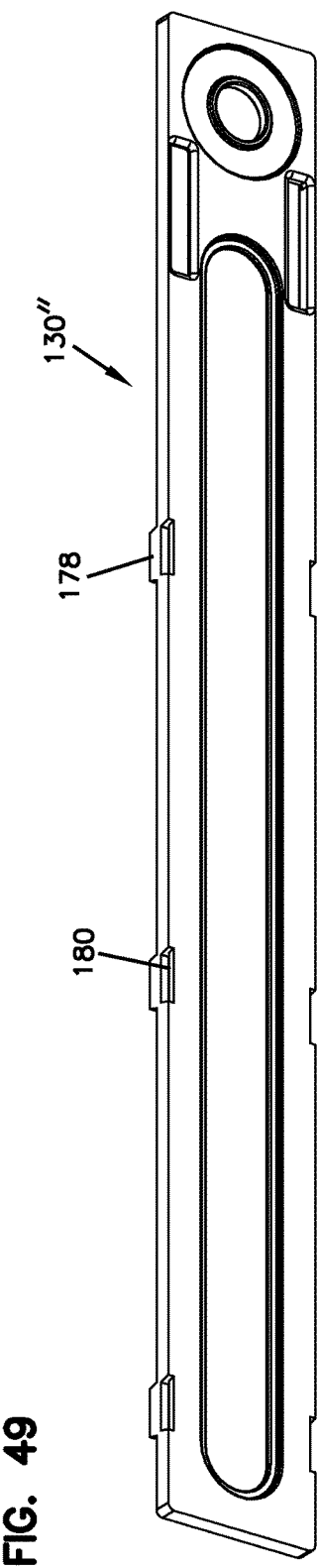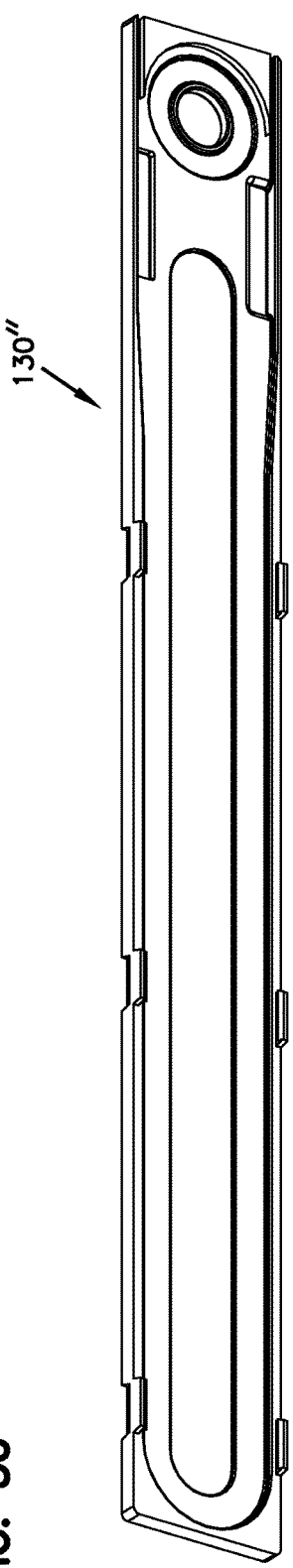

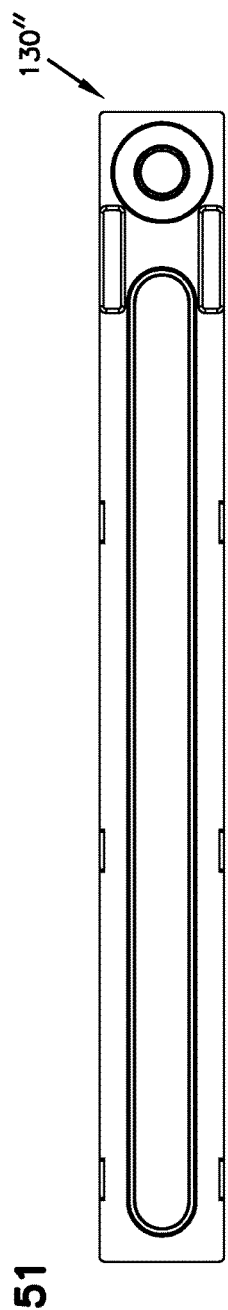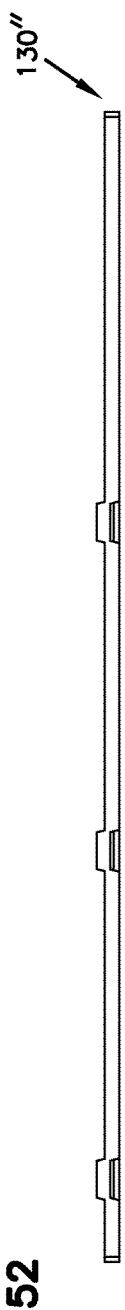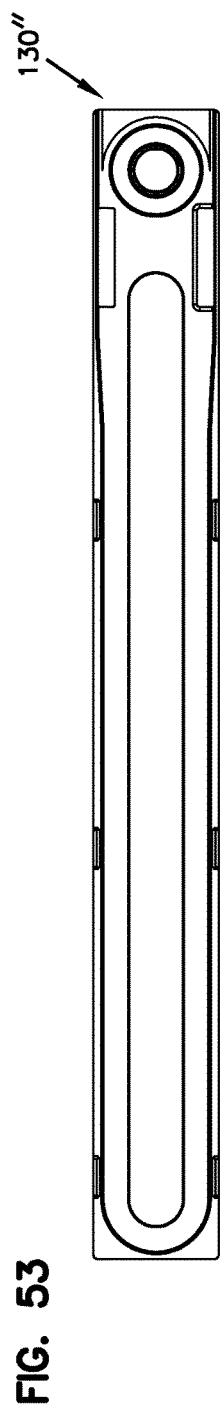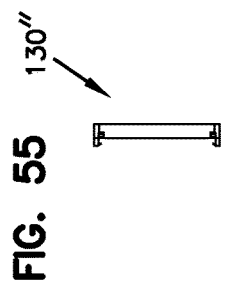

GUIDED CABLE STORAGE ASSEMBLY WITH SWITCHBACKS

CROSS REFERENCE TO RELATED APPLICATIONS

This application claims the benefit of U.S. Provisional Application No. 61/640,410, filed Apr. 30, 2012, and titled "GUIDED CABLE STORAGE ASSEMBLY WITH SWITCHBACKS," the disclosure of which is hereby incorporated herein by reference.

BACKGROUND

Spools, reels, cassettes, and cartridges can be used to store telecommunications cable (e.g., electrical cable and/or fiber optic cable). The spools include a hub or a drum about which the cable is wound. The hub of the spools is often cylindrical, and the cable is often wrapped around the cylindrical hub in a predominantly circumferential manner. By winding up the cable on the spool, the cable can be compactly stored and transported, protected from tangling and kinking, and kept ready for easy deployment.

SUMMARY

An aspect of the present disclosure relates to a cable handling assembly that is adapted to store and pay-out a telecommunications cable. The cable handling assembly includes a first set of pulleys, a second set of pulleys, a housing, and a cable route. The first set of pulleys includes at least one first pulley. The second set of pulleys includes at least one second pulley. The second set of pulleys is spaced from the first set of pulleys by a take-up distance. The take-up distance decreases upon the telecommunications cable being paid-out of the cable handling assembly. The housing includes at least one housing member. The housing supports the first set of pulleys and also supports the second set of pulleys. The housing guides the second set of pulleys as the take-up distance decreases. The cable route is routed between the first set of pulleys and the second set of pulleys. A route length of the cable route decreases as the take-up distance decreases.

Other aspects of the present disclosure may include a cable handling assembly that is adapted to store and pay-out a telecommunications cable. The cable handling assembly includes a plurality of pulley sets and a cable route. The plurality of pulley sets includes at least a first pulley set and a second pulley set. The pulley sets each include a first pulley, a second pulley, and a housing member. The housing member supports the first and the second pulleys and also guides the second pulley as a take-up distance between the first and the second pulleys decreases. The take-up distance decreases upon the telecommunications cable being paid-out of the cable handling assembly. The housing member of the first pulley set may be a first housing member that at least partially defines a first passage. The housing member of the second pulley set may be a second housing member that at least partially defines a second passage. The cable route passes through the first and the second passages. A portion of the cable route that is between the first and the second passages may be routed between the first and the second pulleys of the plurality of pulley sets. A route length of the cable route may be defined between an end of the first passage and an end of the second passage. The route length decreases as the take-up distance decreases.

Still other aspects of the present disclosure may include a rack unit for organizing a plurality of telecommunications cables in a telecommunications rack. The rack unit includes a plurality of cable handling assemblies that are each adapted to store and pay-out a telecommunications cable. The cable handling assemblies each include a plurality of pulley sets. The plurality of pulley sets includes a first pulley, a second pulley, and a housing member. The housing member supports the first and the second pulleys and also guides the second pulley as a take-up distance between the first and the second pulleys decreases. The take-up distance decreases upon the telecommunications cable being paid-out of the cable handling assembly.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 3 is an elevation side view of the retractable cable assembly of FIG. 1;

FIG. 4 is a bottom plan view of the retractable cable assembly of FIG. 1;

FIG. 5 is an opposite side elevation view of the retractable cable assembly of FIG. 1;

FIG. 6 is a top plan view of the retractable cable assembly of FIG. 1;

FIG. 7 is an end elevation view of the retractable cable assembly of FIG. 1;

FIG. 9 is a perspective view of a first pulley of the pulley pair subassembly of FIG. 8;

FIG. 10 is another perspective view of the first pulley of FIG. 9;

FIG. 11 is a side elevation view of the first pulley of FIG. 9;

FIG. 12 is an end elevation view of the first pulley of FIG. 9;

FIG. 17 is a perspective view of a tray of the pulley pair subassembly of FIG. 8;

FIG. 18 is another perspective view of the tray of FIG. 17;

FIG. 27 is another retractable cable assembly according to the principles of the present disclosure, the retractable cable assembly storing a stored portion of a telecommunications cable and paying out a paid-out portion of the telecommunications cable;

FIG. 28 is another perspective view of the retractable cable assembly of FIG. 27;

FIG. 29 is a side elevation view of the retractable cable assembly of FIG. 27;

FIG. 30 is a top plan view of the retractable cable assembly of FIG. 27;

FIG. 31 is an opposite side elevation view of the retractable cable assembly of FIG. 27;

FIG. 32 is an end elevation view of the retractable cable assembly of FIG. 27;

FIG. 49 is a perspective view of a tray of the retractable cable assembly of FIG. 47;

FIG. 50 is another perspective view of the tray of FIG. 49;

FIG. 51 is a side elevation view of the tray of FIG. 49;

FIG. 52 is a top plan view of the tray of FIG. 49;

FIG. 53 is an opposite side elevation view of the tray of FIG. 49;

FIG. 54 is an end elevation view of the tray of FIG. 49;

FIG. 55 is an opposite end elevation view of the tray of FIG. 49;

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure. When like structure is included on different embodiments, a prime (') or double prime (") may be appended to the same reference number to indicate the like structure on a different embodiment.

According to the principles of the present disclosure, a cable handling assembly 100 is adapted to pay out an example telecommunications cable 80. The cable handling assembly 100 can pay out an extended length of the telecommunications cable 80 without disconnecting the telecommunications cable 80 from a paid-out end 82 (i.e. a first end). The cable handling assembly 100 can pay out the extended length of the telecommunications cable 80 without disconnecting the telecommunications cable 80 from a base end 84 (i.e. a second end). In particular, the paid-out end 82 can be pulled from the cable handling assembly 100 at various lengths including the extended lengths to bring the paid-out end 82 of the telecommunications cable 80 to a desired location.

In the depicted embodiments, the second end 84 may serve as a paid-out end, and the first end 82 may serve as a base end. In the depicted embodiments, the second end 84 may serve as a paid-out end, and the first end 82 may also serve as a paid-out end.

Figure 1:
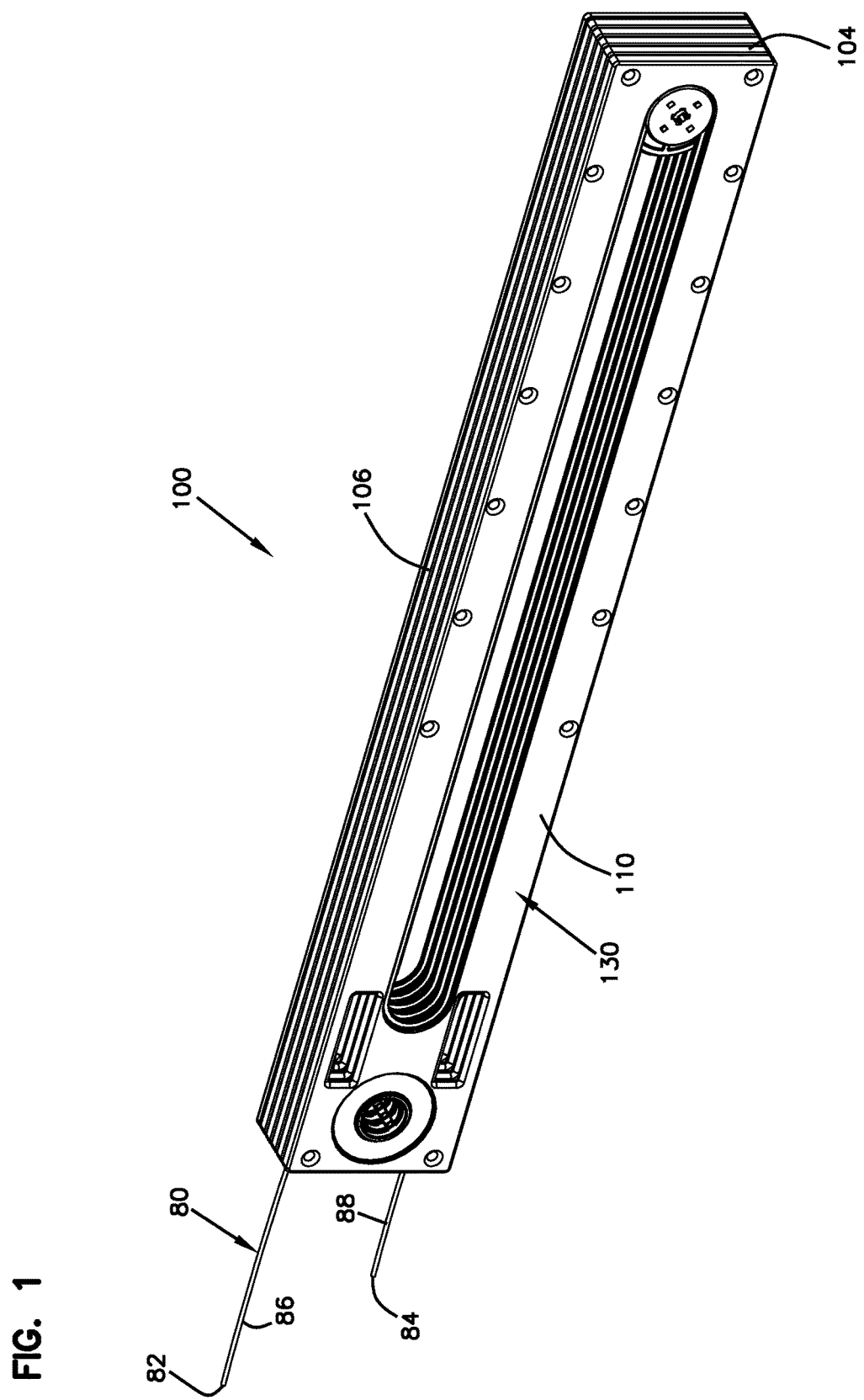
FIG. 1 is a perspective view of a retractable cable assembly according to the principles of the present disclosure, the retractable cable assembly storing a stored portion of a telecommunications cable and paying out a paid-out portion of the telecommunications cable.
Figure 2:
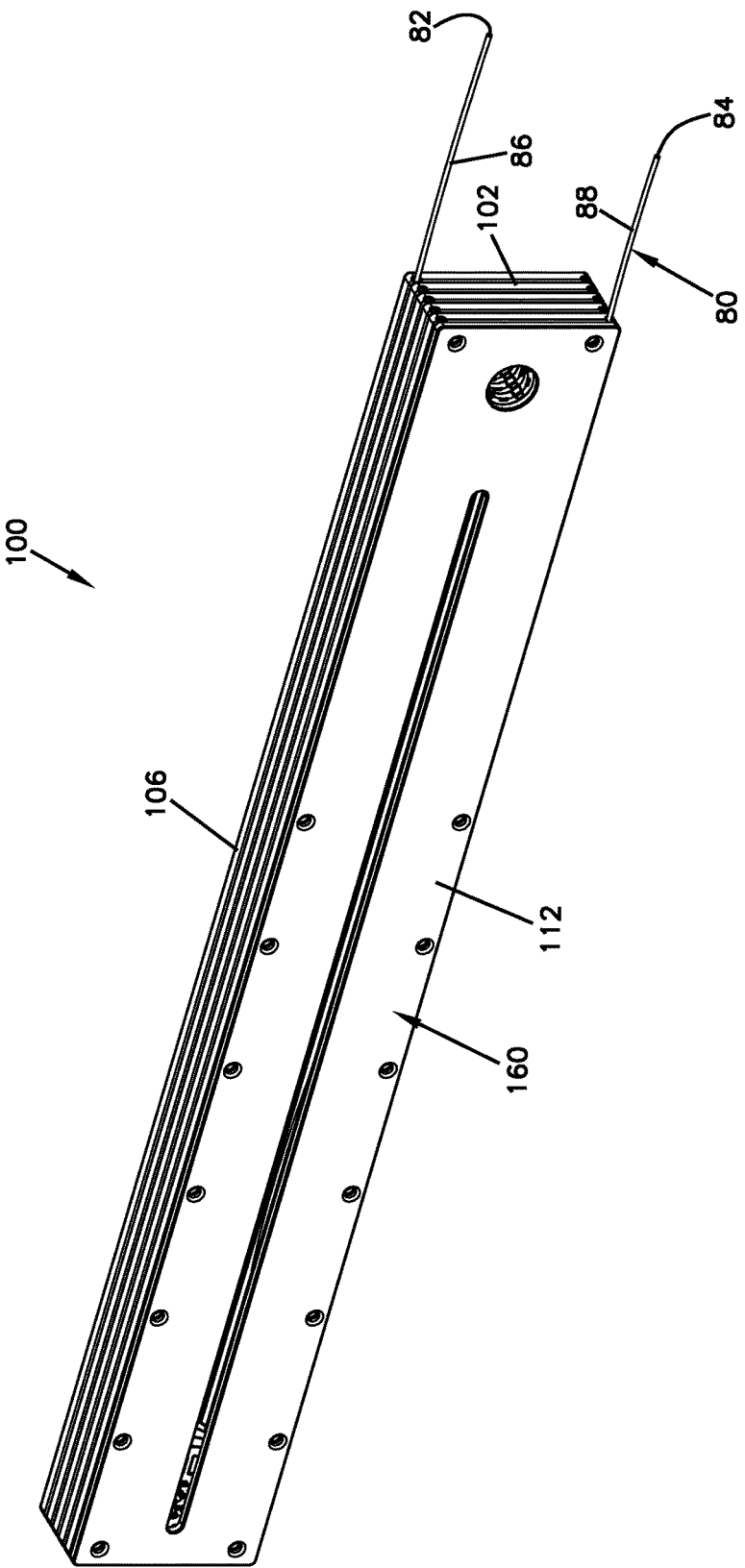
FIG. 2 is another perspective view of the retractable cable assembly of FIG. 1.
Figure 8:
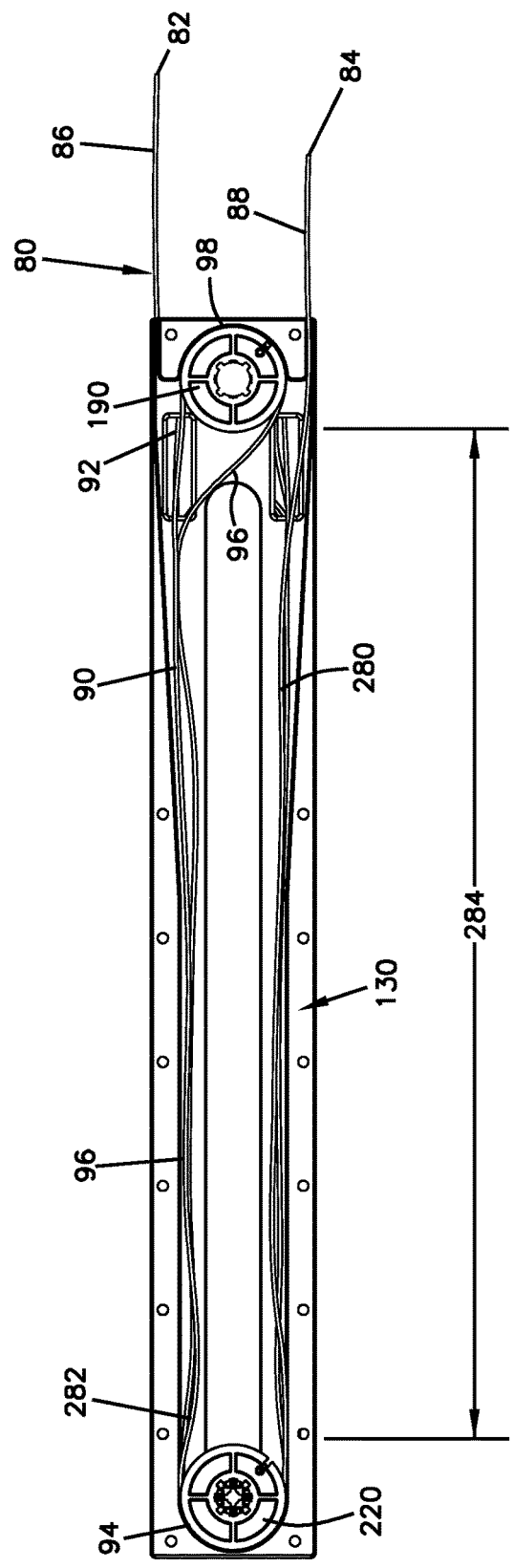
FIG. 8 is an elevation side view of a pulley pair subassembly of the retractable cable assembly of FIG. 1 illustrating a cable routing path.
Figure 13:
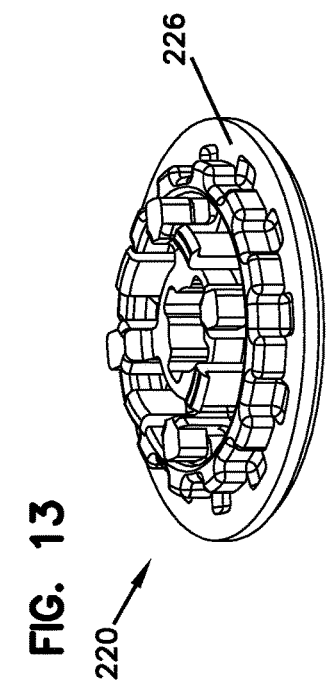
FIG. 13 is a perspective view of a second pulley of the pulley pair subassembly of FIG. 8.
Figure 16:
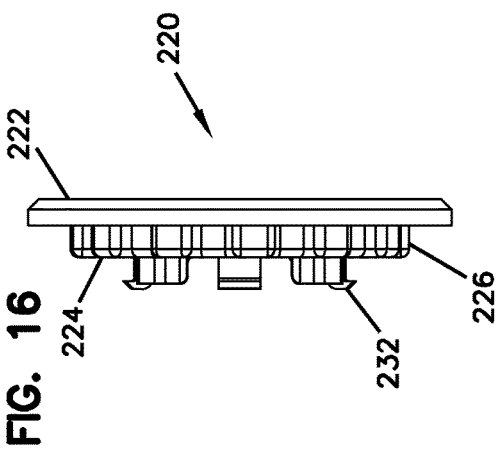
FIG. 16 is an end elevation view of the second pulley of FIG. 13.
Figure 15:
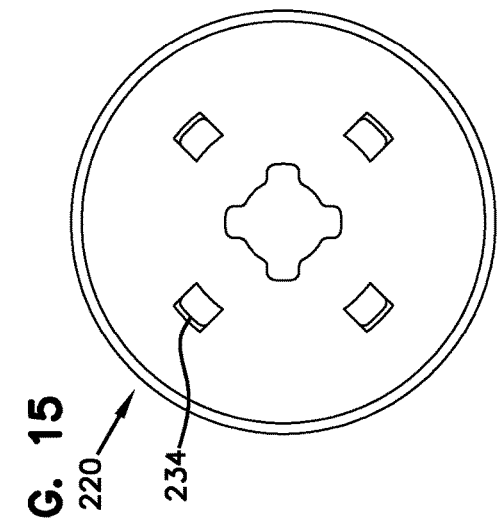
FIG. 15 is an opposite side elevation view of the second pulley of FIG. 13.
Figure 14:
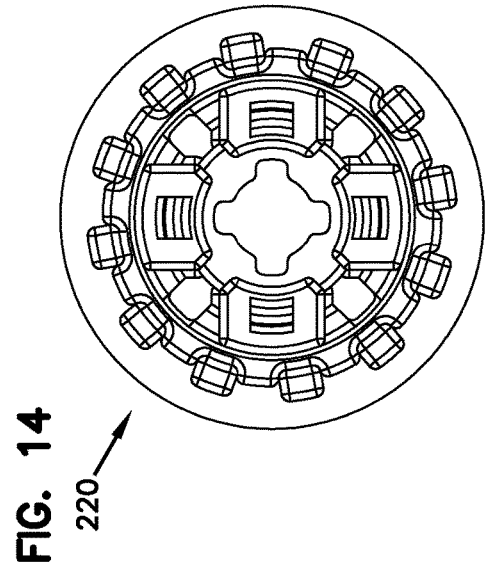
FIG. 14 is a side elevation view of the second pulley of FIG. 13.
Figure 19:
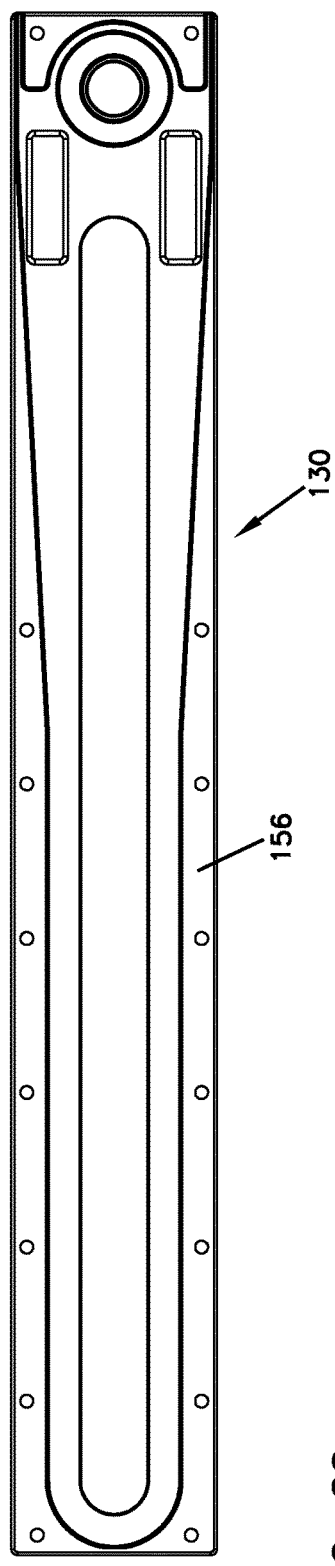
FIG. 19 is a side elevation view of the tray of FIG. 17.
Figure 20:
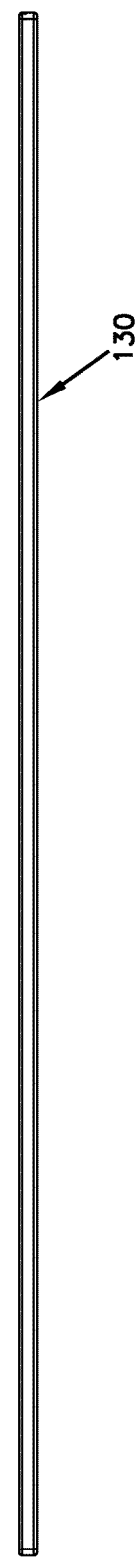
FIG. 20 is a bottom plan view of the tray of FIG. 17.
Figure 21:
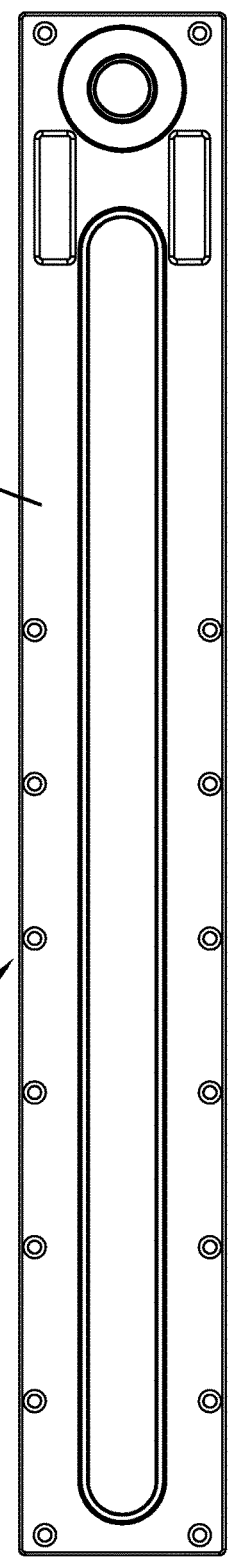
FIG. 21 is an opposite side elevation view of the tray of FIG. 17.
Figure 22:
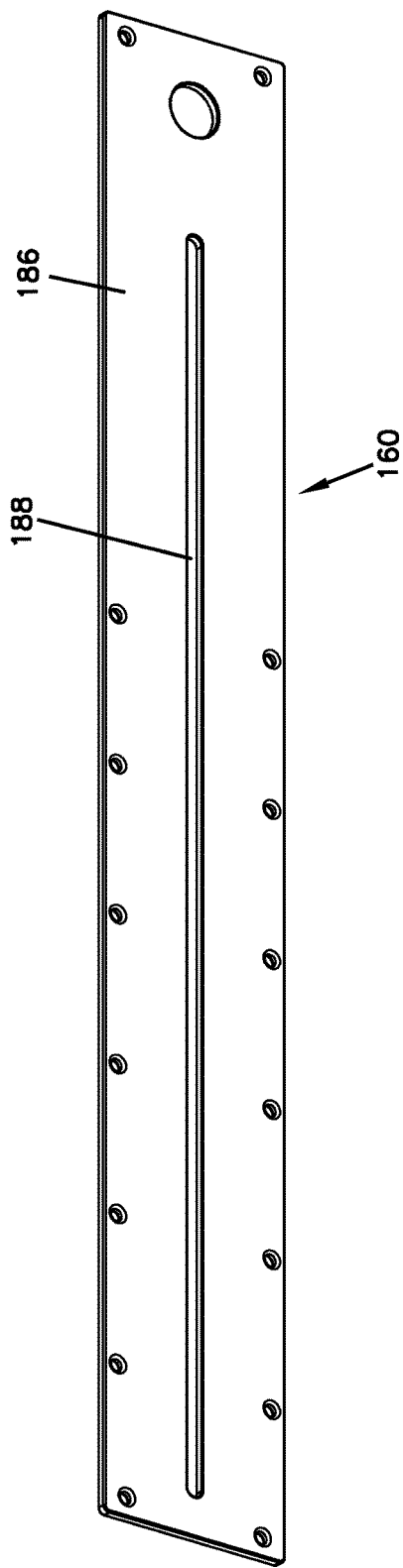
FIG. 22 is a perspective view of a cover of the retractable cable assembly of FIG. 1.
Figure 23:
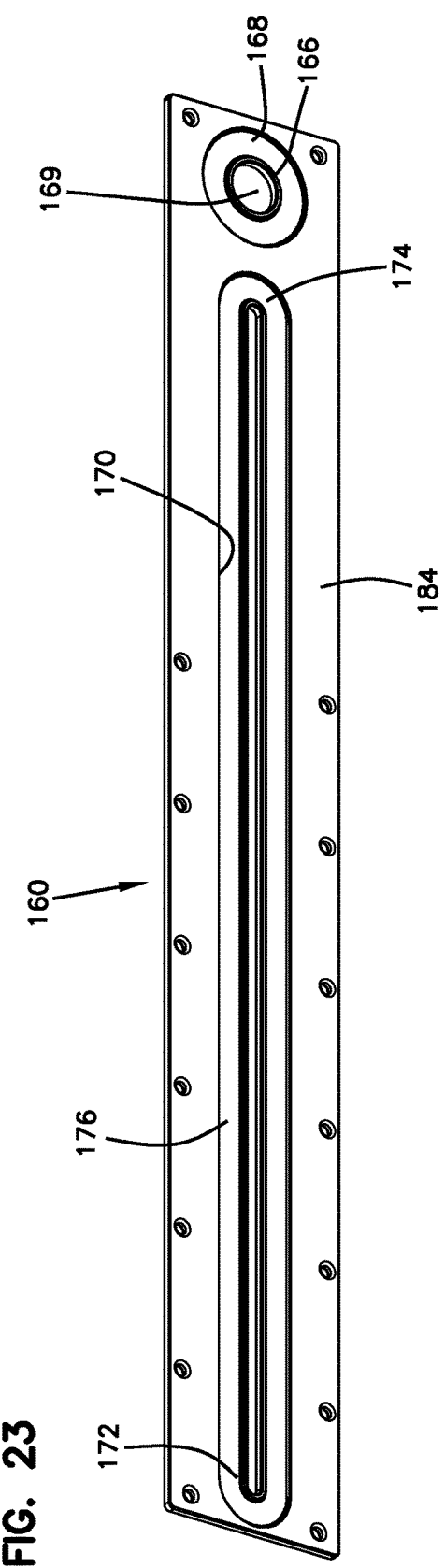
FIG. 23 is another perspective view of the cover of FIG. 22.
Figure 24:
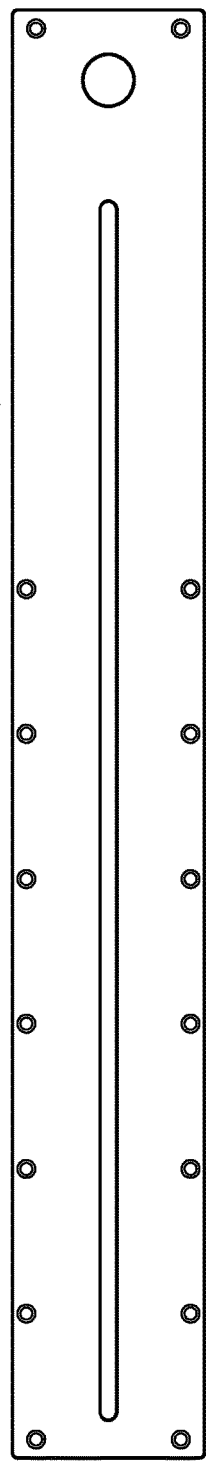
FIG. 24 is a side elevation view of the cover of FIG. 22.
Figure 25:
FIG. 25 is a bottom plan view of the cover of FIG. 22.
Figure 26:
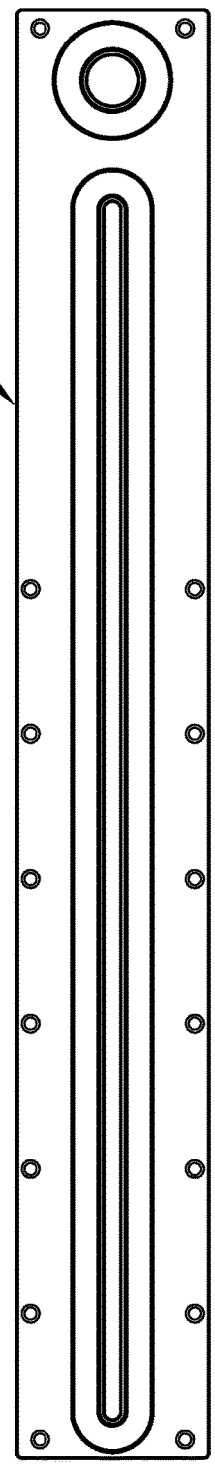
FIG. 26 is an opposite side view of the cover of FIG. 22.

The cable handling assembly 100 does not require a rotary union or substantial accumulated twist in the telecommunications cable 80, but rather defines a cable route 280 (see FIG. 8) upon which a stored portion 90 of the telecommunications cable 80 is stored. As the cable route 280 includes a variable length 282, the stored portion 90 may be transferred to one or both of a first paid-out portion 86 and a second paid-out portion 88. In particular, as the variable length 282 of the cable route 280 decreases, the first paid-out portion 86 and/or the second paid-out portion 88 increases by a similar amount. In particular, the cable route 280 is routed between a first pulley 190 and a second pulley 220 of the cable handling assembly 100 (see FIG. 8). As depicted, the second pulley 220 is spaced from the first pulley 190 by a take-up distance 284. As the take-up distance 284 decreases, the variable length 282 of the cable route 280 decreases thereby allowing transfer of a portion of the stored portion 90 to the first paid-out portion 86 and/or the second paid-out portion 88.

In the depicted embodiment, a plurality of the first pulleys 190 and a plurality of the second pulleys 220 are used, and the cable route 280 is routed back and forth between the first pulleys 190 and the second pulleys 220. In certain embodiments, the first pulley 190 and the second pulley 220 may both move toward each other as the take-up distance 284 decreases. In the depicted embodiment, the first pulley 190 is located at a fixed position and the second pulley 220 moves toward the first pulley 190. In the depicted embodiment, the plurality of the second pulleys 220 moves together toward the plurality of the first pulleys 190 as the take-up distance 284 is reduced. In other embodiments, the second pulleys 220 may move toward the first pulleys 190 individually. In the depicted embodiment, the cable route 280 is arranged about the plurality of the first pulleys 190 and the plurality of the second pulleys 220 in a block-and-tackle type of arrangement. As is known in the art of block-and-tackle arrangements, a change in the take-up distance 284 is multiplied by a number of segments of the telecommunications cable 80 that extend between the plurality of the first pulleys 190 and the second pulleys 220. Thus, a length of the stored portion 90 may be multiple times the length of the take-up distance 284.

The cable route 280 also includes a first pulley-wrapped portion 98 that extends at least partially around the first pulley 190, and a second pulley-wrapped portion 94 that extends at least partially around the second pulley 220. The second pulley-wrapped portion 94 and the first pulley-wrapped portion 98 may remain substantially constant in length as the stored portion 90 is transferred to the first paid-out portion 86 and/or the second paid-out portion 88. A pulley-to-pulley portion 96 of the telecommunications cable 80 is defined between the second pulley-wrapped portion 94 and the first pulley-wrapped portion 98. An entrance portion 92 of the telecommunications cable 80 may be defined as the telecommunications cable 80 extends between the first and/or the last of the first pulleys 190 and/or the second pulleys 220 and the first paid-out portion 86 and/or the second paid-out portion 88.

In certain embodiments, the first end 82 may be substantially fixed in position with the cable handling assembly 100. In certain embodiments, the second end 84 may be substantially fixed in location relative to the cable handling assembly 100. In other embodiments, the first end 82 and/or the second end 84 are each free to change in position with respect to the cable handling assembly 100. In certain embodiments, the first paid-out portion 86 may be transferred to the second paid-out portion 88 without a substantial change in length to the stored portion 90. In certain embodiments, the second paid-out portion 88 may be transferred to the first paid-out portion 86 without a substantial change in length to the stored portion 90. As illustrated, the telecommunications cable 80 may be continuously connected at both the first end 82 and the second end 84 while the first paid-out portion 86 and/or the second paid-out portion 88 are adjusted. Similarly, the first paid-out portion 86 or the second paid-out portion 88 may remain optically connected to an optical device while the first paid-out portion 86 and/or the second paid-out portion 88 are adjusted.

In certain embodiments, the cable handling assembly 100 may include a terminal at the first end 82 or the second end 84. The terminal may not necessarily be substantially extendable from the cable handling assembly 100. The terminal may be generally stationary with the cable handling assembly 100. In certain embodiments, the terminal may be fixed with respect to a housing 200 of the cable handling assembly 100. The terminal may be attached to the housing 200 by the first paid-out portion 86 or the second paid-out portion 88 where the first paid-out portion 86 or the second paid-out portion 88 is not substantially adjustable. The terminal can be connectorized by a fiber optic connecter and/or a fiber optic adapter. The terminal can be permanently or semi-permanently connected to a fiber optic component, a fiber optic network, etc. If it is desired to change the position of the opposite end 82, 84, the terminal can remain connected to the fiber optic component, the fiber optic network, etc.

To accommodate the first paid-out portion 86 and/or the second paid-out portion 88 extending in length, the plurality of the pulley-to-pulley portions 96 change in length to transfer the stored portion 90 to the first paid-out portion 86 and/or the second paid-out portion 88. In certain embodiments, the number of the plurality of the pulley-to-pulley portions 96 does not change as the telecommunications cable 80 is paid-out (e.g., starting from a fully retracted configuration to a fully deployed configuration). The fully retracted configuration may be defined when the stored portion 90 is at a maximum and the plurality of the second pulleys 220 are at a maximum distance from the first pulley 190. The fully deployed configuration may be defined when the plurality of the second pulleys 220 are at a minimum distance to the first pulleys 190 (or even touching the first pulleys 190).

Turning now to FIGS. 1-7, a first embodiment of the cable handling assembly 100 is illustrated. The cable handling assembly 100 extends between a first end 102 and a second end 104. The cable handling assembly 100 also extends from a first side 106 to a second side 108. The cable handling assembly 100 further extends between a third side 110 and a fourth side 112. In the depicted embodiment, the first end 102 of the cable handling assembly 100 is positioned opposite the second end 104, the first side 106 is positioned opposite the second side 108, and the third side 110 is positioned opposite the fourth side 112. As depicted, the paid-out end 82 and the base end 84 of the telecommunications cable 80 both extend from the first end 102 of the cable handling assembly 100. In other embodiments, the first end 82 and/or the second end 84 may extend from different ends and/or different sides from each other.

As depicted at FIGS. 1-7, the housing 200 may be arranged from a plurality of trays 130. As depicted, the trays 130 are stacked upon each other. In this way, the cable handling assembly 100 can be easily customized in the amount of the first paid-out portion 86, the second paid-out portion 88, and the stored portion 90 of the telecommunications cable 80 that can be accommodated. By simply including additional trays 130 or by removing one or more of the trays 130, a capacity of the cable handling assembly 100 can be tailored to a given application. Thus, with a low number of standardized parts, the cable handling assembly 100 may be customized in capacity.

The tray 130 is illustrated at FIGS. 17-21. The tray 130, as depicted, generally matches its sides with the first side 106, the second side 108, the third side 110, and the fourth side 112 of the cable handling assembly 100. As depicted, a first one of the trays 130 is positioned adjacent the third side 110 of the cable handling assembly 100. Additional trays 130 are stacked upon one another, and finally a cover 160 is positioned adjacent a last one of the trays 130. The cover 160 is adjacent the fourth side 112 of the cable handling assembly 100.

As depicted, each of the trays 130 defines a first entrance/exit 132 and a second entrance/exit 134 (see FIG. 17). However, as depicted, only one of the first entrance/exits 132 or only one of the second entrance/exits 134 is used at the first one of the trays 130, and only the other of the first entrance/exits 132 or the second entrance/exits 134 of the last one of the trays 130 is used.

The tray 130 further defines a pulley mount 136 adapted to mount the first pulley 190. A recess 138 may be provided in the tray 130 to provide housing for the first pulley 190. A hole 139 may be further provided at the pulley mount 136 and thereby facilitate the stacking of the first pulley 190 across the stacked arrangement of the trays 130. The pulley mount 136 thereby rotatably mounts the first pulley 190 to the tray 130. As the tray 130 is a component of the housing 200, the pulley mount 136 further mounts the first pulley 190 to the housing 200.

The tray 130 further includes a track 140 adapted to support and guide the second pulley 220. The track 140 extends between a first end 142 and a second end 144. The track 140 may further include a recess 146 and thereby house the second pulley 220. A recess 158 may further accommodate the stacking of the second pulley 220. The track 140 allows for stacking of the second pulley 220 as the trays 130 are stacked. The trays 130 includes a first side 154 and a second side 156. In the depicted embodiment, the first side 154 of an adjacent one of the trays 130 is positioned adjacent the second side 156 of the tray 130. In the depicted embodiment, a thickness between the first side 154 and the second side 156 defines a thin feature of the trays 130. In this arrangement, the first pulley 190 and the second pulley 220 are stacked and thereby share an axis with others of the first pulleys 190 and the second pulleys 220, respectively. In other embodiments, the axes of the individual first pulleys 190 and the axes of the individual second pulleys 220 are not coaxial with each other, but rather are spaced from each other. In certain embodiments, the spaced axes of the individual first pulleys 190 and the individual second pulleys 220 are parallel with each other.

A description will now be given of the operation of the cable handling assembly 100, illustrated at FIGS. 1-6. The cable handling assembly 100 is initially in a fully retracted configuration as illustrated at FIGS. 1-3 and 5. In the fully retracted configuration, the take-up distance 284 is at a maximum distance and the second pulleys 220 are separated from the first pulleys 190 by a maximum amount. The pulley-to-pulley portion 96 and thereby the stored portion 90 are also at a maximum storage configuration. Either the first end 82, the second end 84, or both the first end 82 and the second end 84 of the telecommunications cable 80 may be pulled away from the cable handling assembly 100. In particular, the first end 82 and/or the second end 84 are pulled away from the housing 200 of the cable handling assembly 100. As the first end 82 and/or the second end 84 are pulled away, tension develops in the telecommunications cable 80. The tension urges the second pulleys 220 to move toward the first pulleys 190 and thereby shorten the take-up distance 284. The tension may be transferred from the first end 82 to the second pulley-wrapped portions 94 and to the pulley-to-pulley portions 96 and further to the first pulley-wrapped portions 98. The tension thereby results in a force which moves the second pulleys 220 toward the first pulleys 190. The force is thereby twice the tension amount on each of the second pulleys 220. Tension may likewise be applied at the second paid-out portion 88 and similarly move the second pulleys 220 toward the first pulleys 190.

The amount of the telecommunications cable 80 delivered by the first of the trays 130 and the corresponding second pulley 220 and the corresponding first pulley 190 may be substantially equal to the amount of the increase in the first paid-out portion 86. A portion of the telecommunications cable 80 may be transferred from the adjacent trays 130 to the first of the trays 130 and thereby partially replace a portion of the telecommunications cable 80 in the first of the trays 130 as the first paid-out portion 86 increases. Likewise, additional ones of the trays 130 may supply portions of the telecommunications cable 80 to the adjacent trays 130 that are nearer to the first paid-out portion 86. The second pulley 220 and the first pulley 190 may transfer the tension throughout the cable handling assembly 100 and thereby urge the telecommunications cable 80 along the cable route 280.

Upon the second pulleys 220 and the first pulleys 190 being held stationary, tension applied to the paid-out end 82 may result in a transfer of the second paid-out portion 88 to the first paid-out portion 86, and the telecommunications cable 80 may move through the cable handling assembly 100 along the cable route 280 to accomplish this. Likewise, tension applied to the second end 84 while the second pulleys 220 and the first pulleys 190 remain stationary may result in the first paid-out portion 86 being transferred to the second paid-out portion 88.

To facilitate flow of the telecommunications cable 80 through the trays 130, the trays 130 may include a transition 148 (see FIG. 17). The transition 148 leads into a first passage 150 of the trays 130. Another transition 148 leads into a second passage 152 of the trays 130. The first passage 150 and the second passage 152 allow the telecommunications cable 80 to be routed from the second pulley 220 of one of the trays 130 to another one of the first pulleys 190 belonging to an adjacent one of the trays 130. The telecommunications cable 80 can thereby be routed from the first of the trays 130 through intermediate ones of the trays 130 and finally to the final tray 130.

Turning now to FIGS. 22-26, the cover 160 is illustrated. The cover 160 includes a pulley mount 166 similar to the pulley mount 136. Likewise, the cover 160 includes a recess 168 similar to the recess 138 and a hole 169 similar to the hole 139. The cover 160 includes a track 170 that extends between a first end 172 and a second end 174. The tracks 140, 170 may guide the second pulleys 220 as they move relative to the first pulleys 190. A recess 176 may be defined adjacent to the track 170. The recess 176 and the recess 168 may provide housing for the first pulleys 190 and the second pulleys 220. A slot 188 may be defined on the track 170. The cover 160 extends between a first side 184 and a second side 186. The first side 184 is adjacent to one of the trays 130 (e.g., the first one of the trays 130 or the last one of the trays 130). In the depicted embodiment, the second side 186 defines or at least partially defines the fourth side 112.

Turning now to FIGS. 9-12, the first pulley 190 is illustrated. The first pulley 190 extends between a first side 192 and a second side 194. In the depicted embodiment, a distance between the first side 192 and the second side 194 is slightly larger than a diameter of the telecommunications cable 80. A cable track 196 is defined around a perimeter of the first pulley 190 and is concave in shape thus cradling the telecommunications cable 80. The first pulley 190 may include a hub 198 that is centered on an axis that is coaxial with the cable track 196. The first pulley 190 may include clips 202 that may serve to hold the plurality of the first pulleys 190 together when the first pulleys 190 are stacked upon each other. In certain embodiments, the first pulleys 190 rotate at different rotational speeds as the telecommunications cable 80 is paid out of the cable handling assembly 100.

Turning now to FIGS. 13-16, the second pulley 220 is illustrated. The second pulley 220 extends between a first side 222 and a second side 224. In the depicted embodiment, a distance between the first side 222 and the second side 224 is larger than a diameter of the telecommunications cable 80. A cable track is defined around a perimeter of the second pulley 220 and cradles the telecommunications cable 80. The second pulley 220 may include a hub that is centered on an axis that is coaxial with the cable track. The second pulley 220 may include clips 232 that may serve to hold the plurality of the second pulleys 220 together when the second pulleys 220 are stacked upon each other. In certain embodiments, the second pulleys 220 rotate at different rotational speeds as the telecommunications cable 80 is paid out of the cable handling assembly 100.

Turning now to FIGS. 27-32, another embodiment of a cable handling assembly 100' is illustrated according to the principals of the present disclosure. The cable handling assembly 100' is similar to the cable handling assembly 100 and is similarly numbered, when possible. The similar components of the cable handling assembly 100' will not, in general, be duplicatively described. The cable handling assembly 100' includes features that allow for retraction of the first paid-out portion 86 and/or the second paid-out portion 88 into the cable handling assembly 100'. Thus, according to the principals of the present disclosure the cable handling assembly 100' may deploy the telecommunications cable 80 to the first paid-out portion 86 and/or the second paid-out portion 88 and may also retract the telecommunications cable 80 or portions of the telecommunications cable 80 from the first paid-out portion 86 and/or the second paid-out portion 88.

To accomplish the retraction function, the cable handling assembly 100', in the depicted embodiment, includes a retracting tray assembly 300 (i.e., a retraction mechanism, a retraction apparatus), as illustrated at FIGS. 33 and 37-40. The retracting tray assembly 300 includes a tray 320 similar to the tray 130 and the cover 160. In the depicted embodiment, the tray 320 rotatably mounts a retract wheel 350. In the depicted embodiment, the retract wheel 350 is mounted coaxially with the first pulley 190. In other embodiments, the retract wheel 350 may be mounted in other locations.

Figure 33:
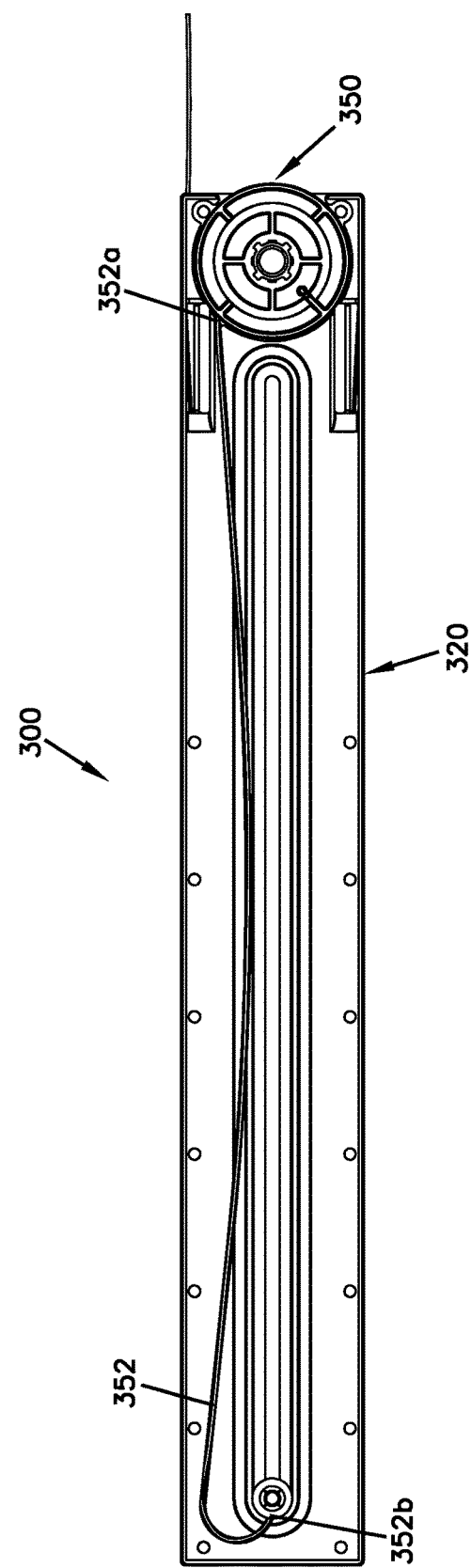
FIG. 33 is a retraction mechanism of the retractable cable assembly of FIG. 27.
Figure 36:
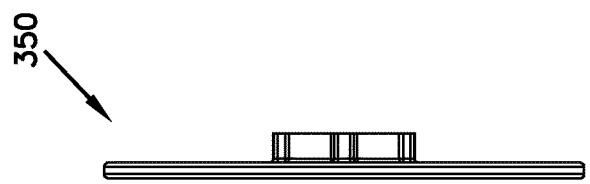
FIG. 36 is an end elevation view of the thumb wheel of FIG. 34.
Figure 35:
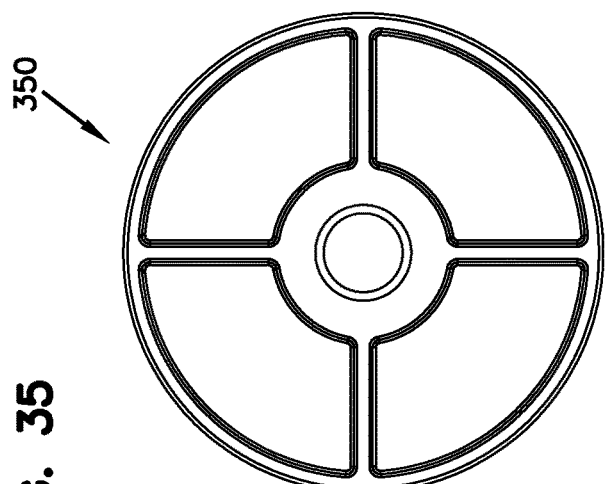
FIG. 35 is a side elevation view of the thumb wheel of FIG. 34.
Figure 34:
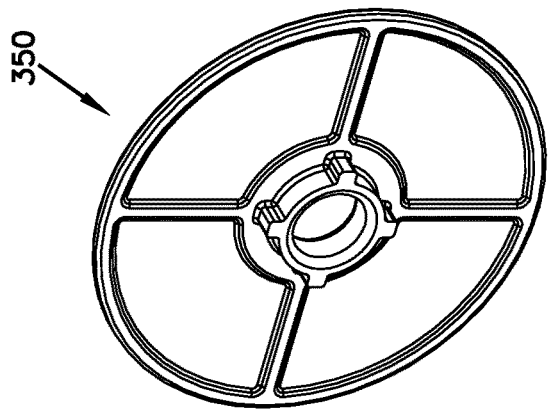
FIG. 34 is a perspective view of a thumb wheel of the retraction mechanism of FIG. 33.
Figure 37:
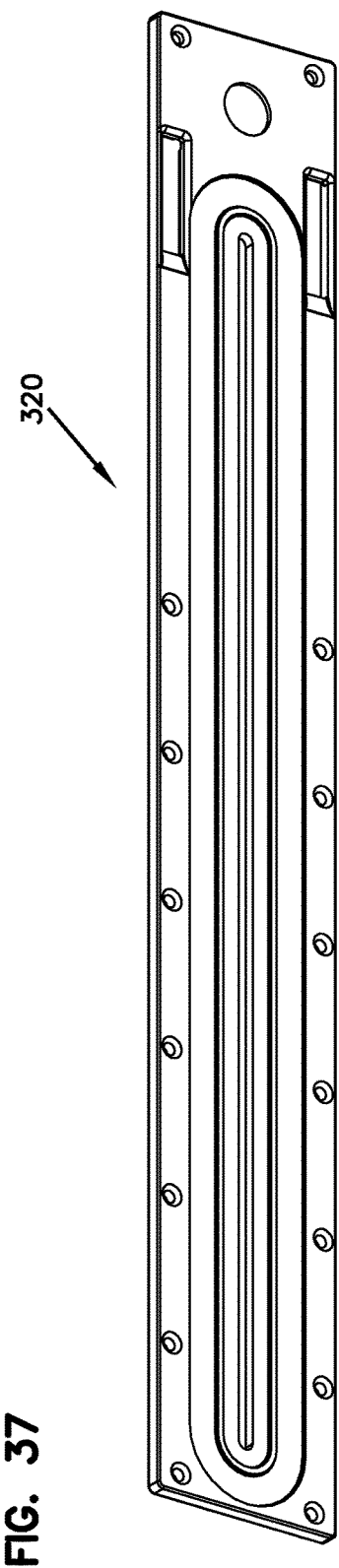
FIG. 37 is a perspective view of a tray of the retraction mechanism of FIG. 33.
Figure 38:
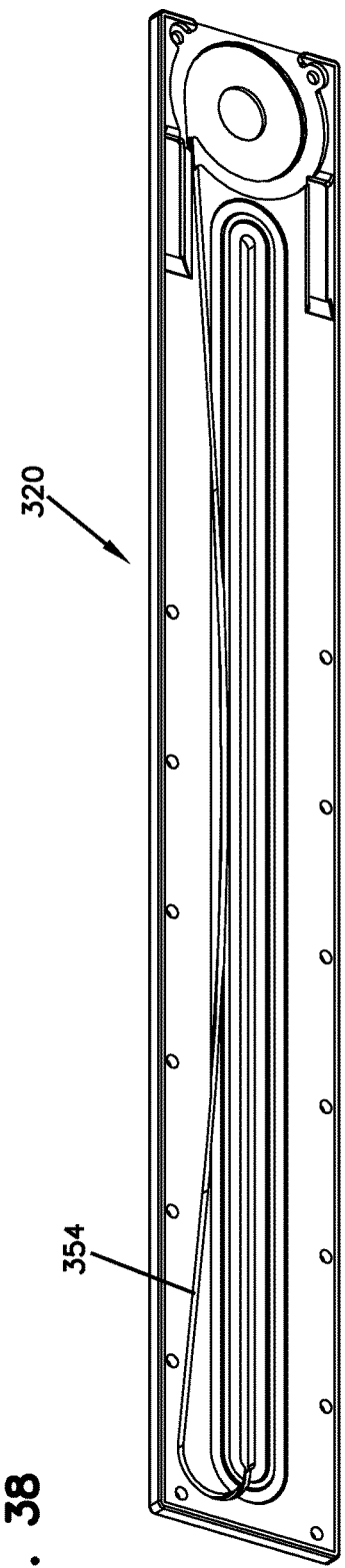
FIG. 38 is another perspective view of the tray of the FIG. 37.
Figure 41:
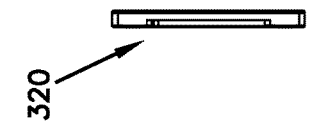
FIG. 41 is an end elevation view of the tray of FIG. 37.
Figure 39:
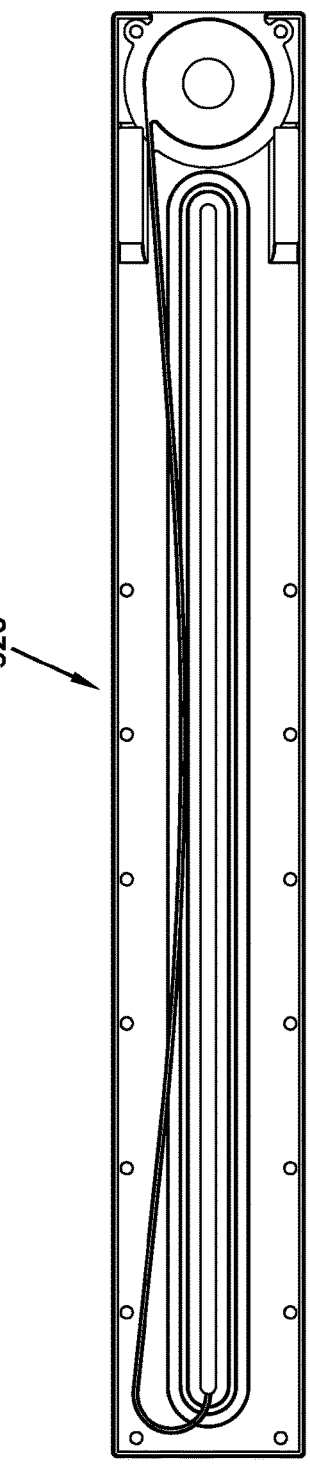
FIG. 39 is a side elevation view of the tray of FIG. 37.
Figure 40:
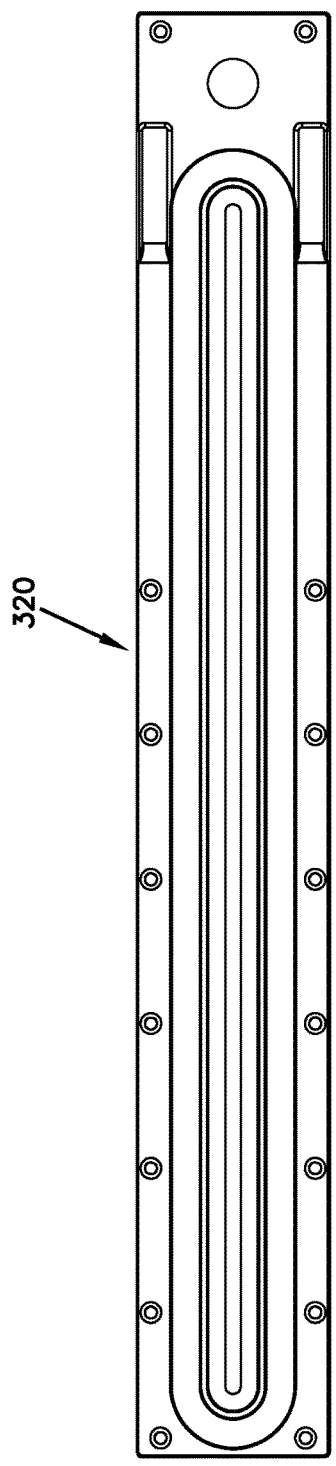
FIG. 40 is an opposite side elevation view of the tray of FIG. 37.

When rotated, the retract wheel 350 pulls on a tension member 352 (see FIG. 33). In the depicted embodiment, the tension member 352 is routed along a groove 354 (i.e., a path) positioned on the tray 320. The tension member 352 extends between a first end 352a adjacent the retract wheel 350 and a second end 352b adjacent the second pulleys 220. As the retract wheel 350 is rotated, the tension member 352 is wound about the retract wheel 350 and thereby retracts the tension member 352. The second end 352b of the tension member 352 pulls on the set of the second pulleys 220 and thereby separates the second pulleys 220 from the first pulleys 190 and increases the take-up distance 284. By increasing the take-up distance 284, the variable length 282 of the cable route 280 is increased and thereby a portion of the telecommunications cable 80 is added to the stored portion 90.

Figure 44:
FIG. 44 is a side elevation view of the pulling axel of FIG. 42.
Figure 43:
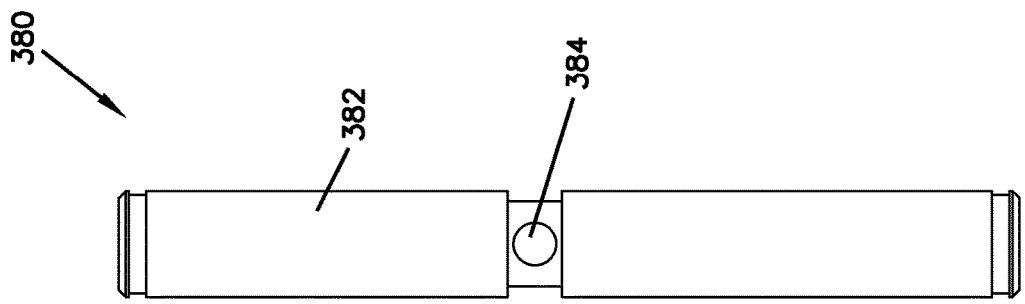
FIG. 43 is an end elevation view of the pulling axel of FIG. 42.
Figure 42:
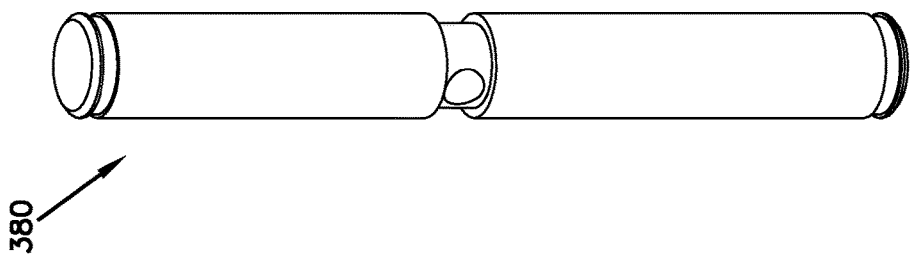
FIG. 42 is a perspective view of a pulling axel of the retraction mechanism of FIG. 33.

As depicted at FIGS. 42-44, an axle 380 may be provided that is rotatably mounted coaxially to the second pulley 220. The axle 380 includes a bearing surface 382 upon which the second pulleys 220 can be rotatably mounted. The axle 380 also includes an attachment hole 384 or other attachment point that the second end 352b of the tension member 352 may be attached to. Thus, as the retract wheel 350 is rotated and winds up the tension member 352, the second end 352b moves away from the first pulleys 190 and carries with it the second pulleys 220.

The retract wheel 350 may be actuated manually. For example, a portion of the retract wheel 350 may protrude beyond a housing of the retracting tray assembly 300 (i.e., the retraction apparatus), as illustrated at FIGS. 27-31. The protruding portion of the retract wheel 350 may, for example, be operated by a technician's thumb.

The retract wheel 350 may be actuated automatically. For example, the retract wheel 350 may be spring-loaded to rotate in a retracting rotational direction. The retract wheel 350 may apply continuous tension to the telecommunications cable 80. In other embodiments, the retract wheel 350 may be held by ratchets, clutches, brakes, etc. and thereby urge retraction of the telecommunications cable 80 only when released. For example, the brake may prevent the retract wheel 350 from applying tension to the telecommunications cable 80 until the brake is released. Upon the brake being released, the spring-loaded retract wheel 350 may urge retraction of the telecommunications cable 80.

The retract wheel 350 may be adapted to be driven by a motor, a hand crank, etc. The motor, hand crank, etc. may be mounted on the cable handling assembly 100', in certain embodiments. In other embodiments, the motor, hand crank, etc. may be engaged with the retract wheel 350 temporarily (e.g., when retraction is performed).

Figure 47:
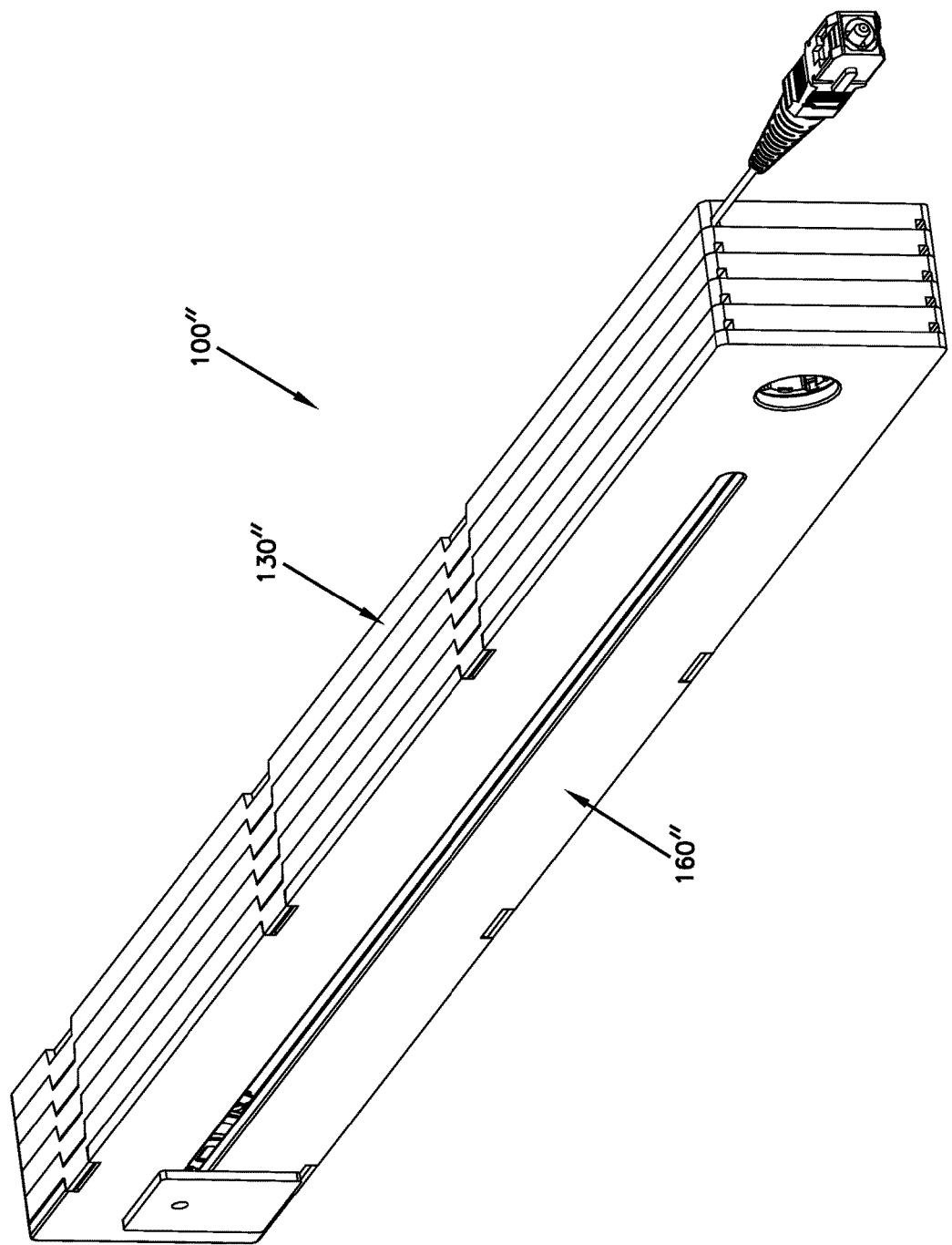
FIG. 47 is a perspective view of one of the retractable cable assemblies of FIG. 45, the retractable cable assembly storing a stored portion of a telecommunications cable and paying out a paid-out portion of the telecommunications cable.
Figure 48:
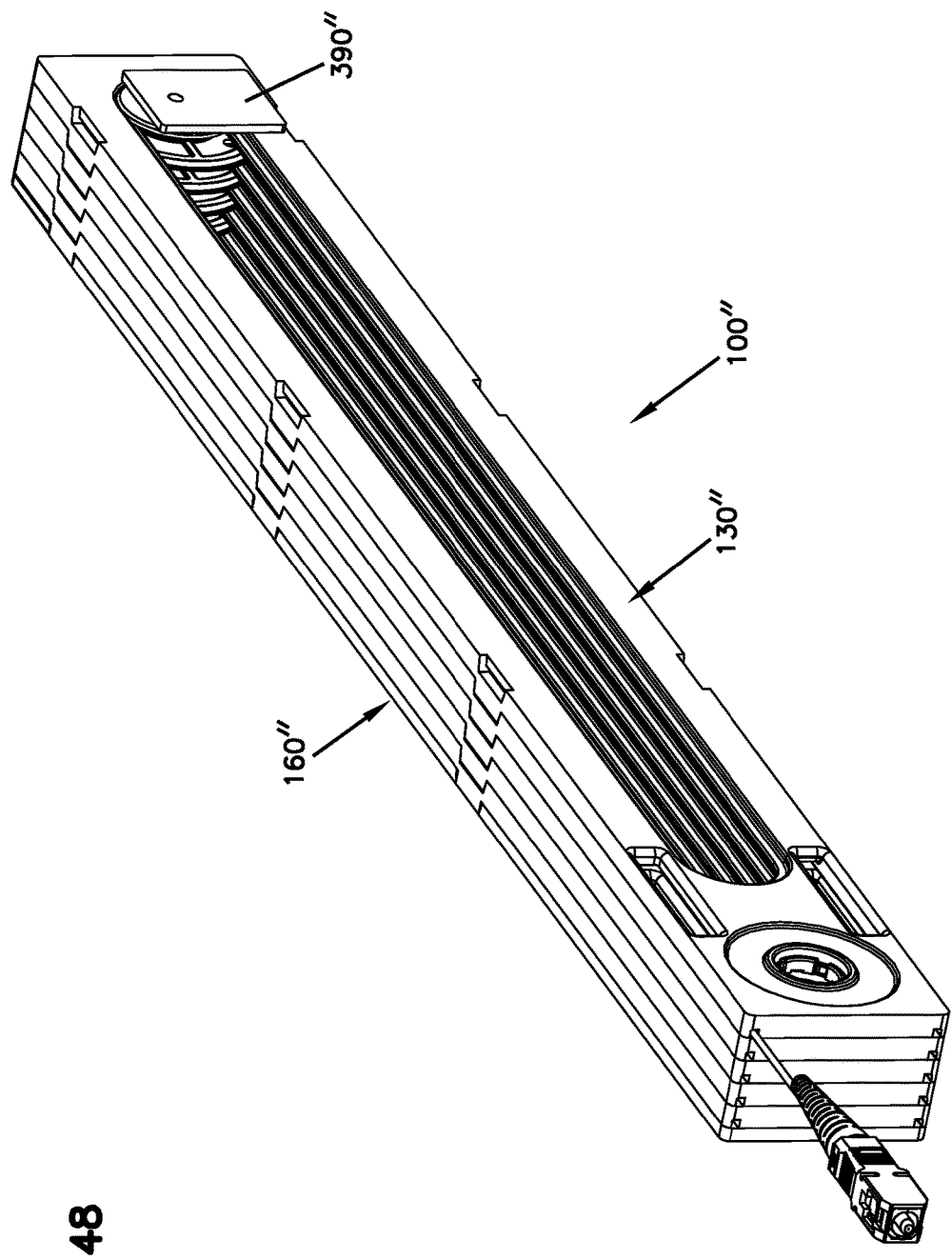
FIG. 48 is another perspective view of the retractable cable assembly of FIG. 47.
Figure 56:
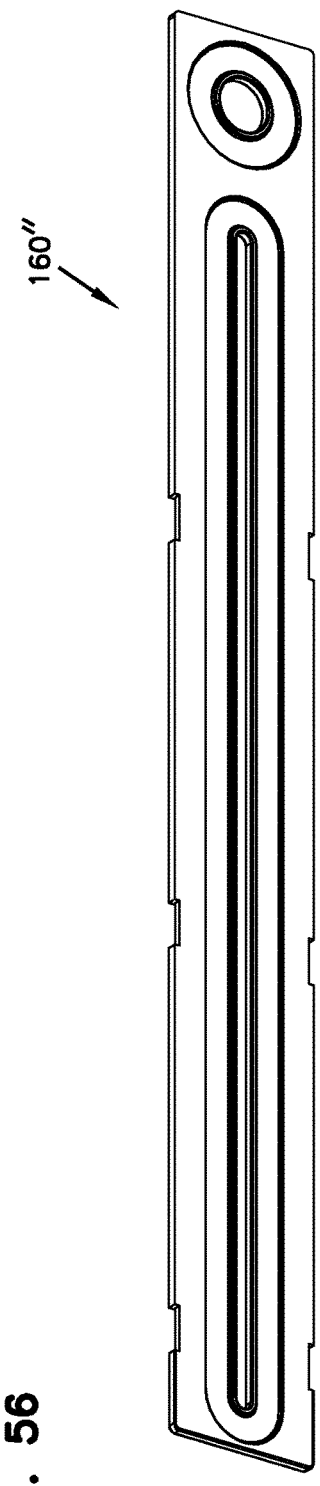
FIG. 56 is a perspective view of a cover tray of the retractable cable assembly of FIG. 47.
Figure 57:
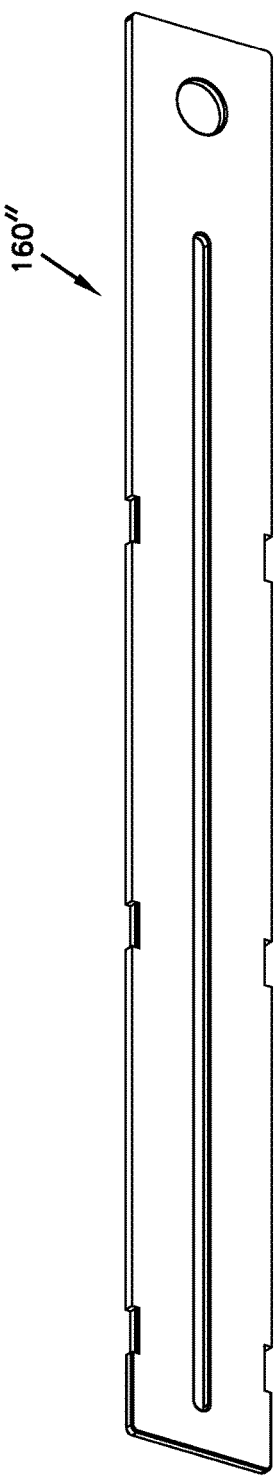
FIG. 57 is another perspective view of the cover tray of FIG. 56.
Figure 58:
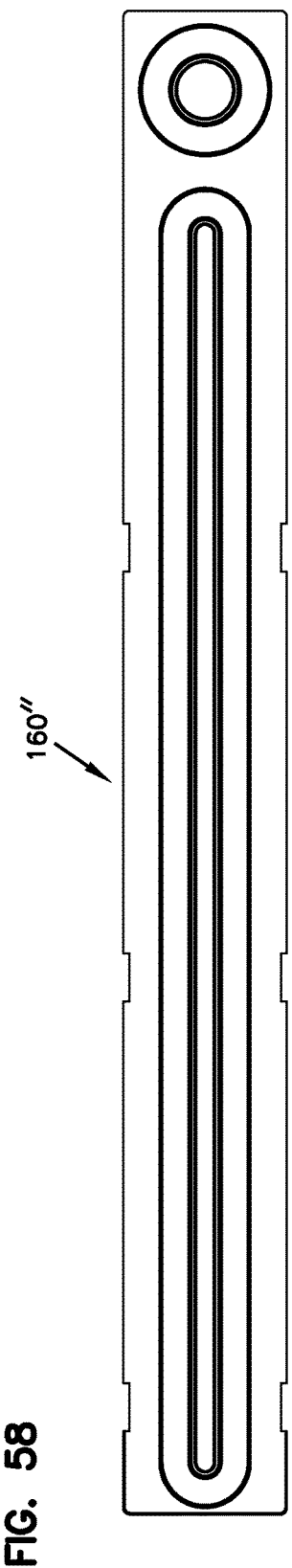
FIG. 58 is a side elevation view of the cover tray of FIG. 56.
Figure 59:
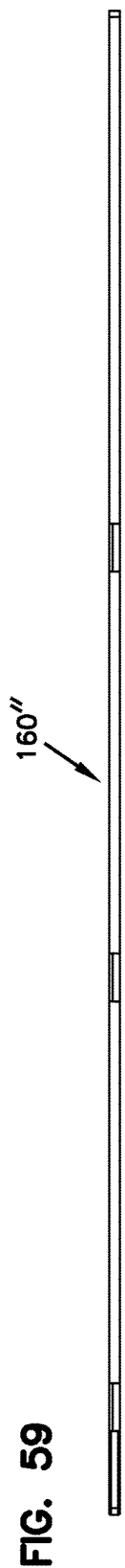
FIG. 59 is a top plan view of the cover tray of FIG. 56.
Figure 60:
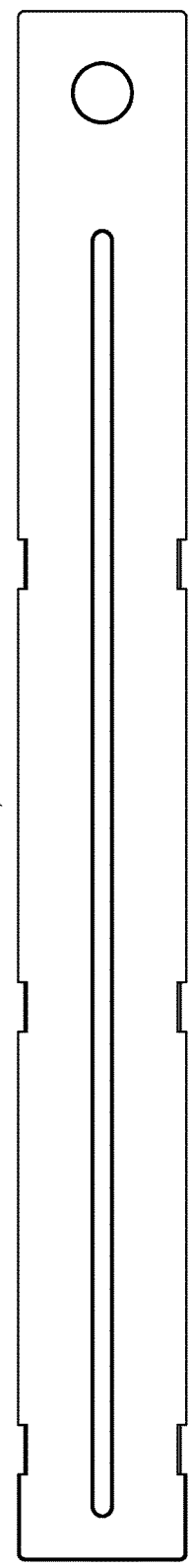
FIG. 60 is an opposite side elevation view of the cover tray of FIG. 56.
Figure 61:
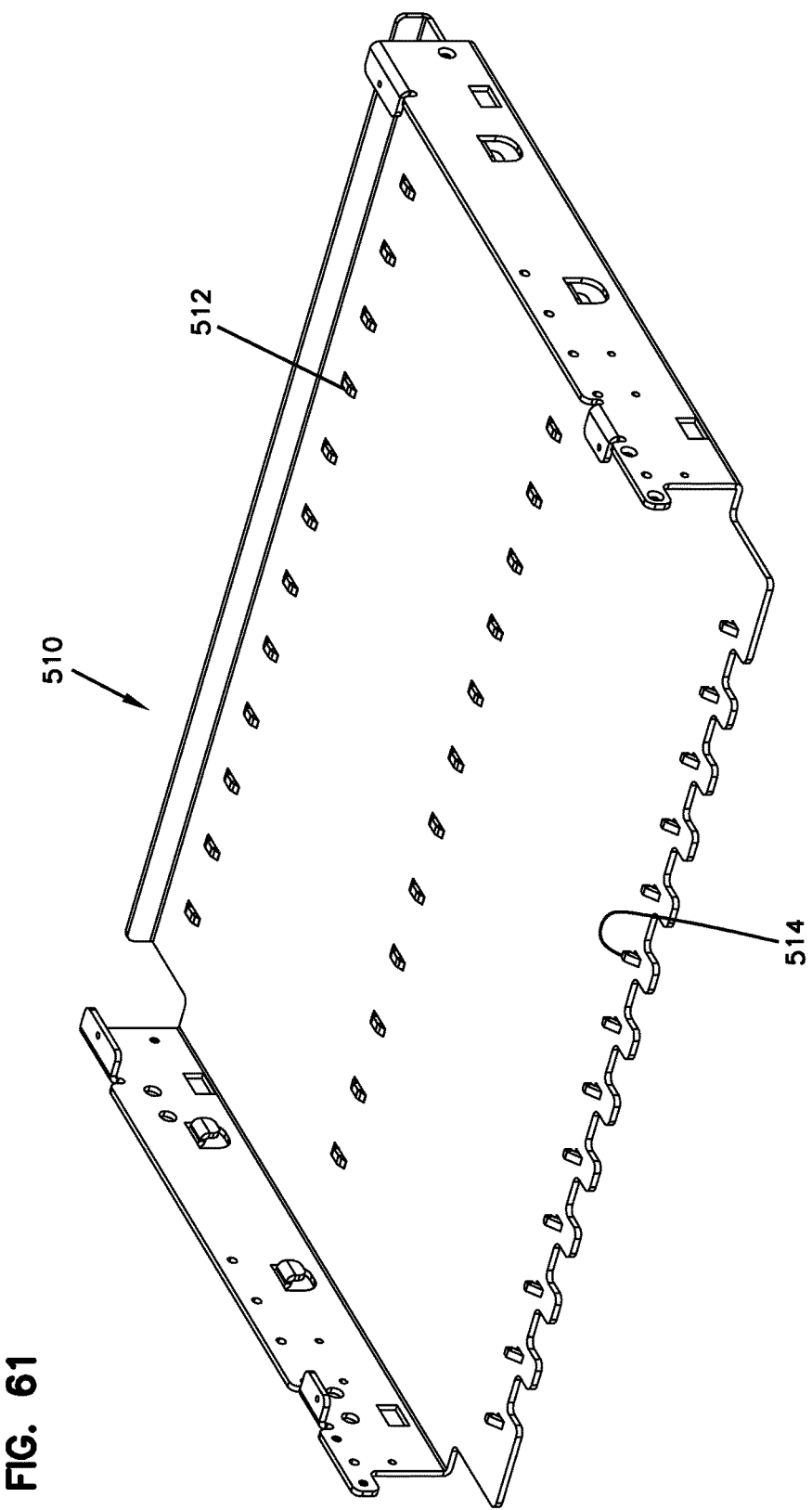
FIG. 61 is a perspective view of a bottom guide and stop plate of the assembly of multiple retractable cable assemblies of FIG. 45.
Figure 62:
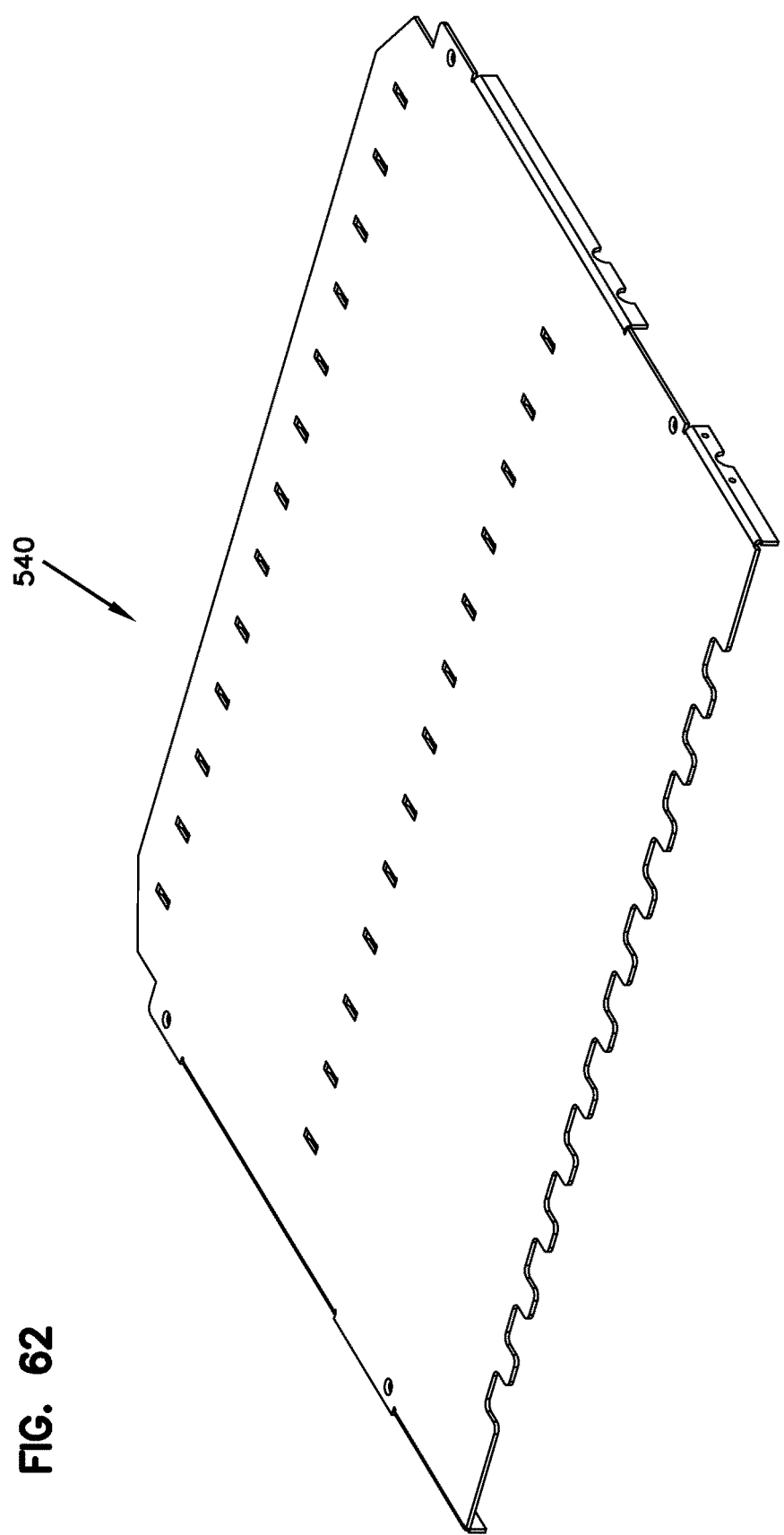
FIG. 62 is a perspective view of a cover of the assembly of multiple retractable cable assemblies of FIG. 45.

Turning now to FIGS. 47 and 48, another embodiment of the cable handling assembly 100" is illustrated, as with the previous embodiment of the cable handling assembly 100', the cable handling assembly 100" is adapted to both deploy the telecommunications cable 80, retract the telecommunications cable 80, and store the telecommunications cable 80. The trays 130" and the cover 160" of the cable handling assembly 100" include a set of tabs 178 and a set of tab receivers 180 that interlock with each other when the trays 130 and the cover 160 are stacked upon each other.

The cable handling assembly 100" includes a retraction actuator 390" that moves with the set of the second pulleys 220 (see FIG. 48). The cable handling assembly 100" may include an axle that joins the retraction actuator 390" to the second pulleys 220. By pulling the retraction actuator 390" away from the set of the first pulleys 190, the telecommunications cable 80 can be retracted into the cable handling assembly 100".

The retraction actuator 390" may be actuated manually, as further described below. The retraction actuator 390" may be actuated automatically. For example, the retraction actuator 390" may be spring-loaded to translate in a retracting direction. The retraction actuator 390" may apply continuous tension to the telecommunications cable 80. In other embodiments, the retraction actuator 390" may be held by ratchets, clutches, brakes, pawls, etc. and thereby urge retraction of the telecommunications cable 80 only when released. For example, the pawl may prevent the retraction actuator 390" from applying tension to the telecommunications cable 80 until the pawl is released. Upon the pawl being released, the spring-loaded retraction actuator 390" may urge retraction of the telecommunications cable 80.

The retraction actuator 390" may be adapted to be driven by a cylinder, a handle, etc. The cylinder, handle, etc. may be mounted on the cable handling assembly 100", in certain embodiments. In other embodiments, the cylinder, handle, etc. may be engaged with the retraction actuator 390" temporarily (e.g., when retraction is performed).

Figure 45:
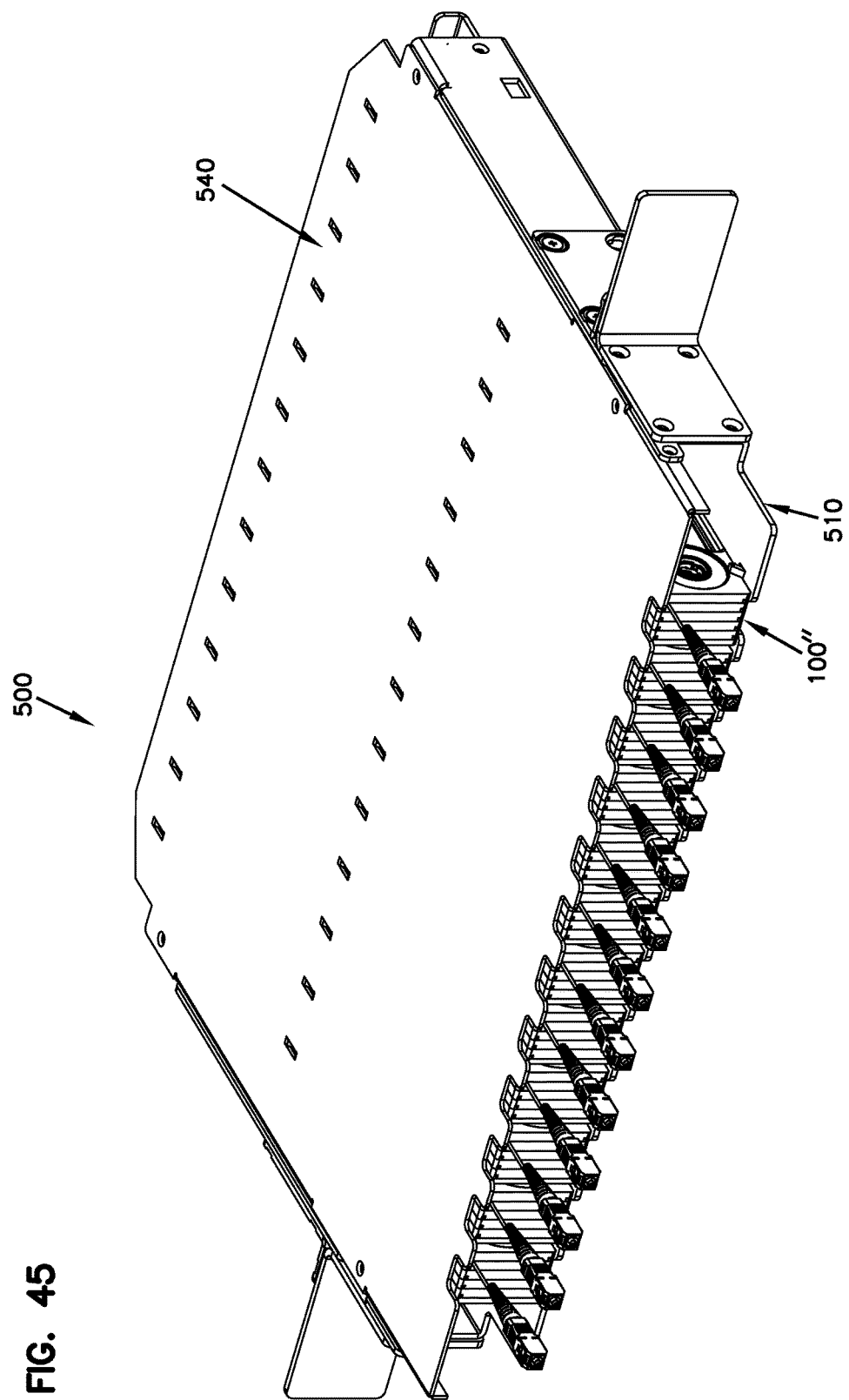
FIG. 45 is a perspective view of an assembly of multiple retractable cable assemblies according to the principles of the present disclosure.
Figure 46:
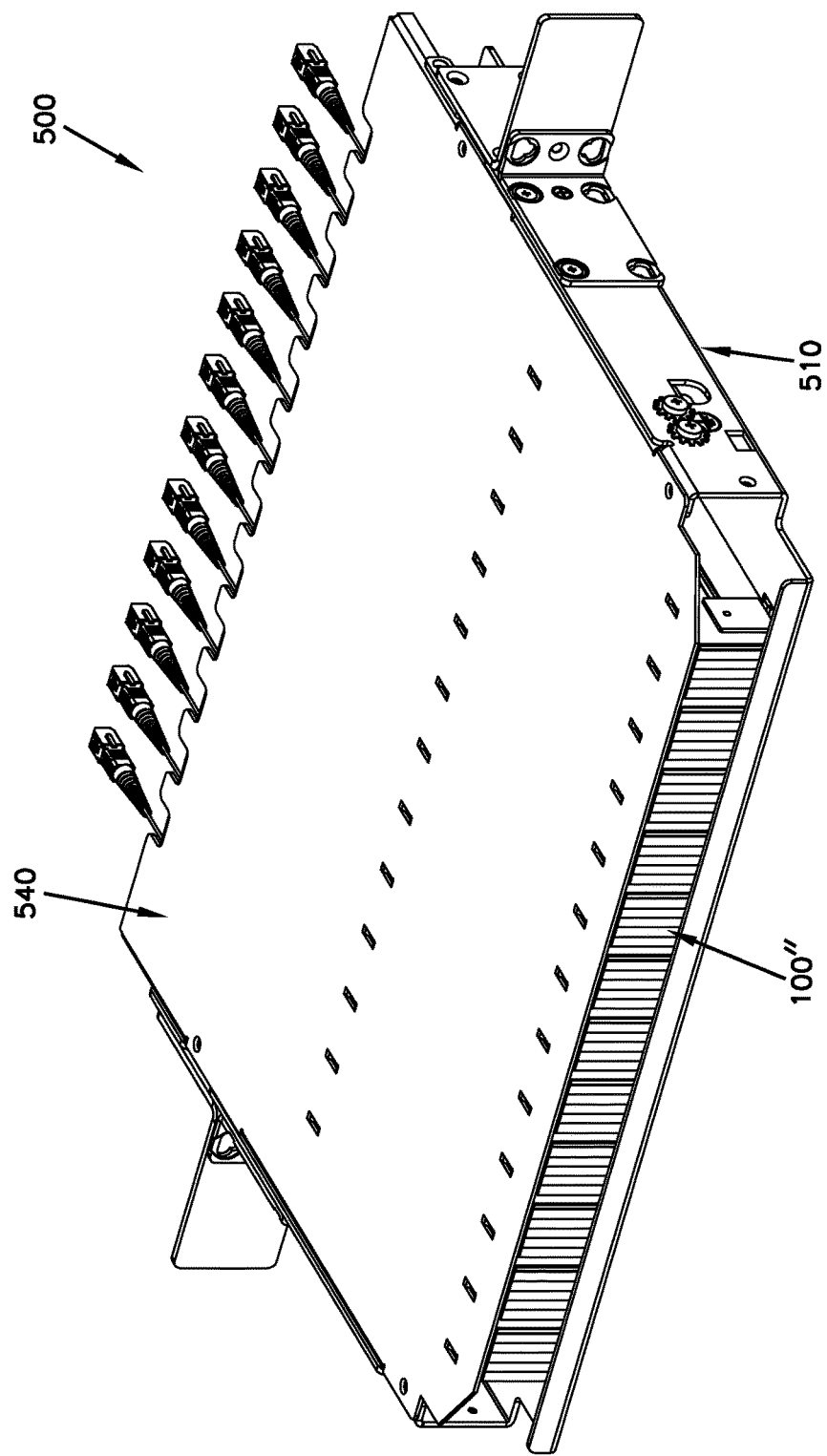
FIG. 46 is another perspective view of the assembly of multiple retractable cable assemblies of FIG. 45.

As illustrated at FIGS. 45 and 46, a plurality of the cable handling assemblies 100" can be held adjacent to each other in a rack assembly 500 according to the principles of the present disclosure. The rack assembly 500 may be included (e.g., mounted) in a telecommunications rack and thereby provide a plurality of the telecommunications cables 80 to interconnect various portions of the telecommunications rack. The rack assembly 500 includes a base 510 and a cover 540 (i.e., a rack member). The cover 540 (i.e., the rack member) may assemble onto the base 510 and thereby secure the cable handling assemblies 100" within the rack assembly 500. A series of holding projections 512 may be included on the base 510 to hold and position the cable handling assembly 100".

The base 510 may further include a series of actuating projections 514. The combination of the actuating projections 514 and the retraction actuator 390" provide a method and a mechanism for retracting the telecommunications cable 80 within the cable handling assembly 100". In particular, the cable handling assembly 100" may be moved within the base 510 and, upon movement, the retraction actuator 390" may contact the actuating projections 514. Upon engaging the retraction actuator 390" with the actuating projections 514 and pulling the cable handling assembly 100" within the rack assembly 500, the retraction actuator 390" is slid away from the first pulleys 190 and thereby retracts or partially retracts the telecommunications cable 80 within the cable handling assembly 100".

According to the principles of the present disclosure, a cable handling assembly 700 is adapted to pay out the example telecommunications cable 80. The cable handling assembly 700 can pay out an extended length of the telecommunications cable 80 without disconnecting the telecommunications cable 80 from the paid-out end 82. The cable handling assembly 700 can pay out the extended length of the telecommunications cable 80 without disconnecting the telecommunications cable 80 from the base end 84. In particular, the paid-out end 82 can be pulled from the cable handling assembly 700 at various lengths including the extended lengths to bring the paid-out end 82 of the telecommunications cable 80 to a desired location.

In the depicted embodiments, the second end 84 may serve as a paid-out end, and the first end 82 may serve as a base end. In the depicted embodiments, the second end 84 may serve as a paid-out end, and the first end 82 may also serve as a paid-out end. Like those above, the cable handling assembly 700 does not require a rotary union or substantial accumulated twist in the telecommunications cable 80, but rather defines a cable route 780 (see FIG. 63) upon which the stored portion 90 of the telecommunications cable 80 is stored. As the cable route 780 includes a variable length 782, the stored portion 90 may be transferred to one or both of the first paid-out portion 86 and the second paid-out portion 88. In particular, as the variable length 782 of the cable route 780 decreases, the first paid-out portion 86 and/or the second paid-out portion 88 increases by a similar amount. In particular, the cable route 780 is routed between a first pulley 790 and a second pulley 820 of the cable handling assembly 700 (see FIG. 63). As depicted, the second pulley 820 is spaced from the first pulley 790 by a take-up distance 884. As the take-up distance 884 decreases, the variable length 782 of the cable route 780 decreases thereby allowing transfer of a portion of the stored portion 90 to the first paid-out portion 86 and/or the second paid-out portion 88.

In the depicted embodiment, a plurality of the first pulleys $790_{1-5}$ and a plurality of the second pulleys $820_{0-5}$ are used, and the cable route 780 is routed back and forth between the first pulleys 790 and the second pulleys 820. In certain embodiments, the first pulley 790 and the second pulley 820 may both move toward each other as the take-up distance 884 decreases. In the depicted embodiment, the first pulley 790 is located at a fixed position and the second pulley 820 moves toward the first pulley 790. In the depicted embodiment, the plurality of the second pulleys 820 moves separately toward the plurality of the first pulleys 790 as the take-up distances 884 are reduced. In other embodiments, the second pulleys 820 may move toward the first pulleys 790 together. In the depicted embodiment, the cable route 780 is arranged about the plurality of the first pulleys 790 and the plurality of the second pulleys 820 in a block-and-tackle type of arrangement. As is known in the art of block-and-tackle arrangements, a change in the take-up distance 884 is multiplied by a number of segments of the telecommunications cable 80 extending between the plurality of the first pulleys 790 and the second pulleys 820 that experience the change. Thus, a length of the stored portion 90 may be multiple times the length of the take-up distance 884.

Figure 63:
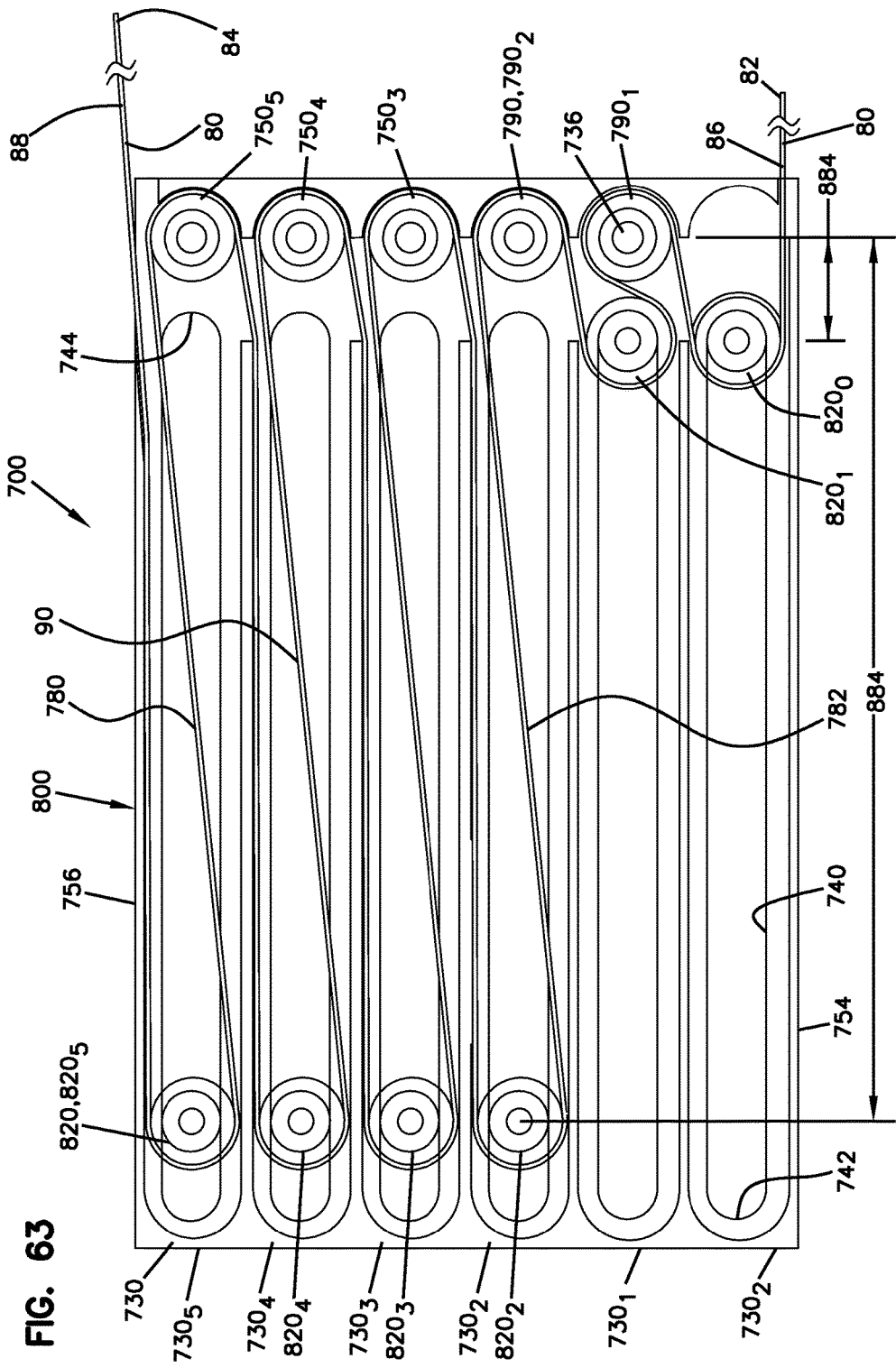
FIG. 63 is a plan view of another retractable cable assembly according to the principles of the present disclosure, the retractable cable assembly storing a stored portion of a telecommunications cable and paying out a paid-out portion of the telecommunications cable.

As depicted at FIG. 63, a housing 800 may be arranged from a plurality of trays $730_{1-5}$. As depicted, the trays 730 may be stacked upon each other. In this way, the cable handling assembly 700 can be easily customized in the amount of the first paid-out portion 86, the second paid-out portion 88, and the stored portion 90 of the telecommunications cable 80 that can be accommodated. By simply including additional trays 730 or by removing one or more of the trays 730, a capacity of the cable handling assembly 700 can be tailored to a given application. The trays 730 may be one-piece with each other, as depicted. In other embodiments, the trays 730 may be separate pieces from each other, as illustrated in the embodiments above. Thus, with a low number of standardized parts, the cable handling assembly 700 may be customized in capacity.

The tray 730 further defines a pulley mount 736 adapted to mount the first pulley 790. The pulley mount 736 thereby rotatably mounts the first pulley 790 to the tray 730. As the tray 730 is a component of the housing 800, the pulley mount 736 further mounts the first pulley 790 to the housing 800.

The tray 730 further includes a track 740 adapted to support and guide the second pulley 820. The track 740 extends between a first end 742 and a second end 744. The trays 730 includes a first side 754 and a second side 756. In the depicted embodiment, the first side 754 of an adjacent one of the trays 730 is positioned adjacent the second side 756 of the tray 730. In the depicted embodiment, a width between the first side 754 and the second side 756 defines a width of the trays 730. In this arrangement, the first pulley 790 and the second pulley 820 do not share an axis with others of the first pulleys 790 and the second pulleys 820, respectively. In this arrangement, the first pulleys 790 and the second pulleys 820 have axes parallel with other axes of the first pulleys 790 and the second pulleys 820. In other embodiments, the axes of the individual first pulleys 790 and the axes of the individual second pulleys 820 are not parallel with each other, but rather are angled from each other.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A rack assembly for organizing a plurality of telecommunications cables in a telecommunications rack, the rack assembly comprising:
  a plurality of cable handling assemblies each adapted to store and pay-out a telecommunications cable, the cable handling assemblies each including a plurality of pulley sets that include a first pulley, a second pulley, and a housing member that supports the first and the second pulleys and also guides the second pulley as a take-up distance between the first and the second pulleys decreases, the take-up distance decreasing upon the telecommunications cable being paid-out of each respective cable handling assembly; and
  an actuating projection;
  wherein at least one of the cable handling assemblies includes a retraction actuator that adapts the at least one cable handling assembly to retract the corresponding telecommunications cable; and
  wherein the at least one cable handling assembly retracts the corresponding telecommunications cable by engaging the retraction actuator of the at least one cable handling assembly with the actuating projection of the rack assembly and by pulling the at least one cable handling assembly within the rack assembly.

2. The rack assembly of claim 1, wherein the retraction actuator engages the actuating projection upon the at least one cable handling assembly being at least partially withdrawn from the rack assembly.

* * * * *